(12) United States Patent
Morita et al.

(10) Patent No.: US 10,305,939 B2
(45) Date of Patent: May 28, 2019

(54) MANAGEMENT SYSTEM AND METHOD OF STARTING COMMUNICATION

(71) Applicants: Kenichiro Morita, Tokyo (JP); Takuya Imai, Tokyo (JP); Shoh Nagamine, Kanagawa (JP); Junpei Mikami, Kanagawa (JP)

(72) Inventors: Kenichiro Morita, Tokyo (JP); Takuya Imai, Tokyo (JP); Shoh Nagamine, Kanagawa (JP); Junpei Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 244 days.

(21) Appl. No.: 15/334,358

(22) Filed: Oct. 26, 2016

(65) Prior Publication Data

US 2017/0134440 A1    May 11, 2017

(30) Foreign Application Priority Data

Nov. 6, 2015 (JP) ................................. 2015-218544

(51) Int. Cl.
   *G06F 15/16*   (2006.01)
   *H04L 29/06*   (2006.01)

(52) U.S. Cl.
   CPC ...... *H04L 65/1059* (2013.01); *H04L 65/1069* (2013.01); *H04L 65/403* (2013.01)

(58) Field of Classification Search
   None
   See application file for complete search history.

(56) References Cited

U.S. PATENT DOCUMENTS

| | | | |
|---|---|---|---|
| 9,210,371 B2 | 12/2015 | Morita et al. | |
| 9,374,556 B2 | 6/2016 | Nagamine et al. | |
| 9,572,012 B2* | 2/2017 | Okuyama | H04N 7/15 |
| 2002/0062201 A1* | 5/2002 | Duranton | G06F 9/5072 |
| | | | 702/122 |
| 2003/0120840 A1* | 6/2003 | Isozu | H04L 67/16 |
| | | | 710/36 |
| 2013/0278712 A1* | 10/2013 | Maeda | H04L 65/80 |
| | | | 348/14.08 |
| 2013/0335512 A1* | 12/2013 | Maeda | H04N 7/15 |
| | | | 348/14.08 |
| 2014/0049597 A1* | 2/2014 | Inoue | H04N 7/15 |
| | | | 348/14.08 |

(Continued)

FOREIGN PATENT DOCUMENTS

| | | |
|---|---|---|
| JP | H10-051557 | 2/1998 |
| JP | 2008-306683 | 12/2008 |
| JP | 2011-035833 | 2/2011 |

*Primary Examiner* — Phyllis A Book
(74) *Attorney, Agent, or Firm* — IPUSA, PLLC

(57) ABSTRACT

A management system is provided that includes a memory storing a program and a processor configured to execute the program to implement processes of receiving a communication start request from a first terminal for starting communication with a second terminal corresponding to a communication counterpart of the first terminal, determining whether communication can be established between the first terminal and the second terminal based on information on a codec supported by the first terminal and information on a codec supported by the second terminal, and transmitting a determination result of the determination to the first terminal.

6 Claims, 27 Drawing Sheets

(56) References Cited

U.S. PATENT DOCUMENTS

| | | |
|---|---|---|
| 2014/0118475 A1 | 5/2014 | Nagamine et al. |
| 2014/0244460 A1 | 8/2014 | Imai et al. |
| 2014/0368410 A1 | 12/2014 | Imai et al. |
| 2015/0249571 A1* | 9/2015 | Mihara ............... G06F 3/04842 715/735 |
| 2015/0282233 A1* | 10/2015 | Homma ................. H04W 4/50 370/329 |
| 2015/0319100 A1* | 11/2015 | Asai ....................... H04L 47/70 709/229 |
| 2015/0334350 A1* | 11/2015 | Tamura ............... H04L 12/1827 348/14.1 |
| 2015/0365727 A1 | 12/2015 | Nagamine et al. |
| 2016/0044070 A1* | 2/2016 | Panicker ............... H04L 65/403 709/204 |
| 2016/0080449 A1 | 3/2016 | Nagamine et al. |
| 2016/0094594 A1 | 3/2016 | Imai et al. |
| 2016/0094595 A1 | 3/2016 | Shiro et al. |
| 2016/0134666 A1* | 5/2016 | Ethier ................... H04L 65/403 709/204 |
| 2016/0139782 A1* | 5/2016 | Scott ................... G06F 3/04842 715/756 |
| 2016/0277462 A1 | 9/2016 | Morita et al. |

\* cited by examiner

FIG.5

| RELAY DESTINATION TERMINAL IP ADDRESS | IMAGE QUALITY OF RELAYED IMAGE DATA |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.7

| RELAY APPARATUS ID | OPERATION STATUS | RECEPTION DATE/TIME | RELAY APPARATUS IP ADDRESS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.8

| TERMINAL ID | PASSWORD |
|---|---|
| 01aa | aaaa |
| 01ab | abab |
| 01ba | baba |
| ... | ... |

FIG.9

| TERMINAL ID | DESTINATION NAME | OPERATION STATUS | COMMUNICATION STATUS | RECEPTION DATE/TIME | TERMINAL IP ADDRESS | ENCODER VIDEO/AUDIO | DECODER VIDEO/AUDIO |
|---|---|---|---|---|---|---|---|
| 01aa | JAPAN TOKYO OFFICE AA TERMINAL | ONLINE | NONE | 2009.11.10. 13:40 | 1.2.1.3 | H.264 / SPEEX | H.264 / SPEEX |
| 01ab | JAPAN TOKYO OFFICE AB TERMINAL | OFFLINE | — | 2009.11.09. 12:00 | 1.2.1.4 | H.264, H.265 / SPEEX, OPUS | H.264, H.265 / SPEEX, OPUS |
| ... | ... | ... | ... | ... | ... | ... | ... |
| 01ba | JAPAN OSAKA OFFICE BA TERMINAL | ONLINE | CALLING | 2009.11.10. 13:45 | 1.2.2.3 | H.264 / SPEEX | H.264, H.265 / SPEEX, OPUS |
| 01bb | JAPAN OSAKA OFFICE BB TERMINAL | ONLINE | NONE | 2009.11.10. 13:50 | 1.2.2.4 | H.264 / SPEEX | H.264 / SPEEX |
| ... | ... | ... | ... | ... | ... | ... | ... |
| 01ca | U.S.A. NEW YORK OFFICE CA TERMINAL | OFFLINE | — | 2009.11.10. 12:45 | 1.3.1.3 | H.264, H.265 / SPEEX, OPUS | H.264, H.265 / SPEEX, OPUS |
| 01cb | U.S.A. NEW YORK OFFICE CB TERMINAL | ONLINE | NONE | 2009.11.10. 13:55 | 1.3.1.4 | H.264 / SPEEX | H.264 / SPEEX |
| ... | ... | ... | ... | ... | ... | ... | ... |
| 01da | U.S.A. WASHINGTON OFFICE DA TERMINAL | ONLINE | BUSY | 2009.11.08. 12:45 | 1.3.2.3 | H.264 / SPEEX | H.264, H.265 / SPEEX, OPUS |
| 01db | U.S.A. WASHINGTON OFFICE DB TERMINAL | ONLINE | NONE | 2009.11.10. 12:45 | 1.3.2.4 | H.264, H.265 / SPEEX, OPUS | H.264, H.265 / SPEEX, OPUS |
| ... | ... | ... | ... | ... | ... | ... | ... |

FIG.10

| REQUESTING TERMINAL ID | DESTINATION TERMINAL ID |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ⋮ | ⋮ |
| 01db | 01aa, 01ab, 01ba, ···, 01ca, 01cb, ···, 01da |
| ⋮ | ⋮ |

FIG.11

| SESSION ID | RELAY APPARATUS ID | REQUESTING TERMINAL ID | DESTINATION TERMINAL ID | DELAY TIME (ms) | DELAY INFORMATION RECEPTION DATE/TIME |
|---|---|---|---|---|---|
| se1 | 111a | 01aa | 01bb, 01cb, 01db | 200 | 2009.11.10.14:00 |
| se2 | 111b | 01ba | 01ca | 50 | 2009.11.10.14:10 |
| se3 | 111c | 01bb | 01da | 400 | 2009.11.10.14:20 |
| ⋮ | ⋮ | ⋮ | ⋮ | ⋮ | ⋮ |

FIG.12

| DELAY TIME (ms) | IMAGE DATA QUALITY |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTED) |

FIG.13

| TERMINAL ID | RELAY APPARATUS ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.14

| CHANGE REQUEST INFORMATION | BEFORE-CHANGE STATUS INFORMATION | CHANGE INFORMATION |
|---|---|---|
| CALL | NONE | ACCEPTED |
| JOIN | ACCEPTED | BUSY |
| LEAVE | BUSY | NONE |

FIG.15

| CHANGE REQUEST INFORMATION | TERMINAL INFORMATION | BEFORE-CHANGE STATUS INFORMATION | CHANGE INFORMATION |
|---|---|---|---|
| INVITE | REQUESTING | NONE | CALLING |
| | DESTINATION | NONE | RINGING |
| | SELF-SELECTION | NONE | ACCEPTED |
| ACCEPT | REQUESTING | CALLING | ACCEPTED |
| | | ACCEPTED | ACCEPTED |
| | DESTINATION | RINGING | ACCEPTED |
| CANCEL | REQUESTING | ACCEPTED | ACCEPTED |
| | | CALLING | NONE |
| | DESTINATION | RINGING | NONE |

FIG.16

| CHANGE REQUEST INFORMATION | TERMINAL INFORMATION | DETERMINATION INFORMATION | BEFORE-CHANGE STATUS INFORMATION | CHANGE INFORMATION |
|---|---|---|---|---|
| REJECT | REQUESTING | PARTIAL | CALLING | CALLING |
| | | ALL | CALLING | NONE |
| | | PARTIAL | ACCEPTED | ACCEPTED |
| | DESTINATION | – | RINGING | NONE |

FIG.17

| NO VIDEO TRANSMISSION | NO VIDEO RECEPTION | NO AUDIO TRANSMISSION | NO AUDIO RECEPTION |
|---|---|---|---|
| – | JAPAN OSAKA OFFICE AA TERMINAL | JAPAN TOKYO OFFICE BB TERMINAL | – |
| – | – | U.S.A. NEW YORK OFFICE CC TERMINAL | – |
| ... | ... | ... | ... |

FIG.19

| | VIDEO | AUDIO |
|---|---|---|
| TRANSMISSION | NO PROBLEMS | UNABLE TO TRANSMIT TO FOLLOWING LOCATION(S)<br><br>JAPAN TOKYO OFFICE BB TERMINAL<br>U.S.A. NEW YORK OFFICE CC TERMINAL |
| RECEPTION | UNABLE TO RECEIVE FROM FOLLOWING LOCATION(S)<br><br>JAPAN OSAKA OFFICE AA TERMINAL | NO PROBLEMS |

START CONFERENCE UNDER ABOVE CONDITIONS?

OK — 501

CANCEL — 502

FIG.24

MANAGEMENT SYSTEM AND METHOD OF STARTING COMMUNICATION

CROSS-REFERENCE TO RELATED APPLICATIONS

The present application claims priority under 35 U.S.C. § 119 to Japanese Patent Application No. 2015-218544 filed on Nov. 6, 2015, the entire contents of which are incorporated herein by reference.

BACKGROUND OF THE INVENTION

1. Field of the Invention

The present disclosure relates to a management system and a method of starting communication.

2. Description of the Related Art

Conference systems for holding a conference remotely across multiple locations via a communication network such as a LAN or the Internet are becoming widespread.

When starting a conference in such a conference system, techniques are known for generating and establishing a session for the conference and checking information on codecs supported by other terminals that are to participate in the conference (see e.g., Japanese Unexamined Patent Publication No. H10-051557).

SUMMARY OF THE INVENTION

According to one embodiment of the present invention, a management system is provided that includes a memory storing a program and a processor configured to execute the program to implement processes of receiving a communication start request from a first terminal for starting communication with a second terminal corresponding to a communication counterpart of the first terminal, determining whether communication can be established between the first terminal and the second terminal based on information on a codec supported by the first terminal and information on a codec supported by the second terminal, and transmitting a determination result of the determination to the first terminal.

BRIEF DESCRIPTION OF THE DRAWINGS

FIG. 5 illustrates an example quality change management table;

FIG. 7 illustrates an example relay apparatus management table;

FIG. 8 illustrates an example terminal authentication management table;

FIG. 9 illustrates an example terminal management table;

FIG. 10 illustrates an example destination list management table;

FIG. 11 illustrates an example session management table;

FIG. 12 illustrates an example quality management table;

FIG. 13 illustrates an example relay apparatus selection management table;

FIG. 14 illustrates an example status change management table;

FIG. 15 illustrates another example status change management table;

FIG. 16 illustrates another example status change management table;

FIG. 17 illustrates an example of codec correspondence information;

FIG. 19 is a diagram illustrating an example display screen based on the codec correspondence information;

FIG. 24 is a conceptual diagram illustrating a destination list according to an embodiment of the present invention;

DESCRIPTION OF THE EMBODIMENTS

An aspect of the present invention relates to providing a technique for enabling easier notification of information on codecs that can be used in a conference.

In the following, embodiments of the present invention are described with reference to the accompanying drawings.

Figure 1:
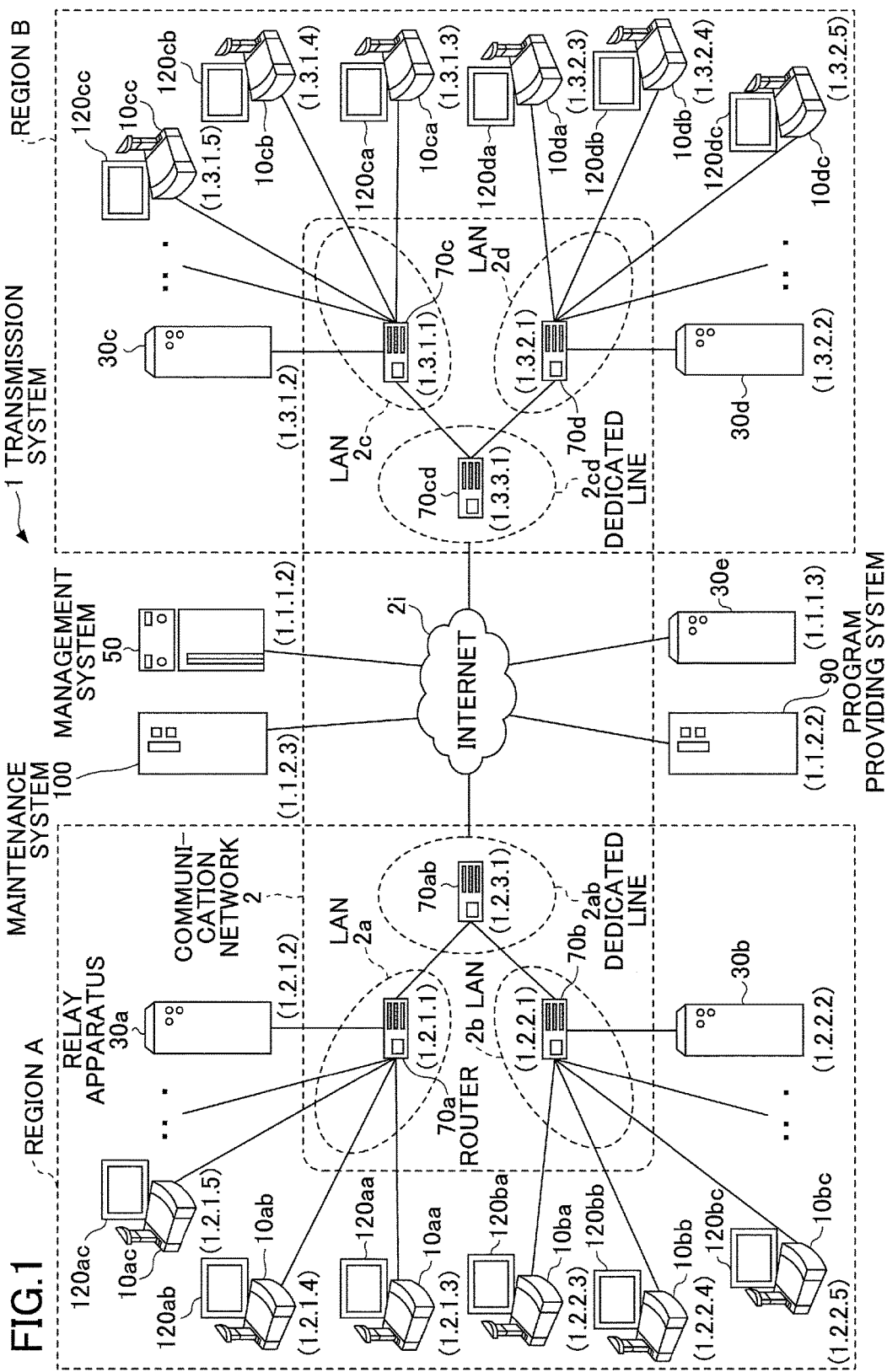
FIG. 1 is a schematic diagram of a transmission system according to an embodiment of the present invention.

FIG. 1 is a schematic diagram of a transmission system 1 according to an embodiment of the present invention.

Note that examples of a transmission system include a data providing system for transmitting content data in one direction from one transmission terminal to another transmission terminal via a transmission management system, and a communication system for conveying information and emotions to/from a plurality of transmission terminals via a transmission management system. The communication system is a system for conveying information and emotions to/from a plurality of communication terminals (transmission terminals) via a communication management system (transmission management system). Specific examples of the communication system include a video conference system, a teleconference system, an audio conference system, an audio telephone system, and a PC (personal computer) screen sharing system.

Note that in the example embodiments of the present invention described below, a video conference system is illustrated as an example communication system (transmission system), a video conference management system is illustrated as an example communication management system (transmission management system), and video conference terminals are illustrated as example communication terminals (transmission terminals). However, applications of the present invention are not limited to a video conference system but may also include other types of communication systems and transmission systems.

In FIG. 1, the transmission system 1 includes a plurality of transmission terminals 10*aa*-10*ac*, 10*ba*-10*bc*, 10*ca*-10*cc*, and 10*da*-10*dc*; a plurality of displays 120*aa*-120*ac*, 120*ba*-120*bc*, and 120*ca*-120*cc* for the transmission terminals 10*aa*-10*ac*, 10*ba*-10*bc*, 10*ca*-10*cc*, and 10*da*-10*dc*; a plurality of relay apparatuses 30*a*-30*e*; a transmission management system 50; a program providing system 90; and a maintenance system 100.

Note that in the following descriptions, "transmission terminal" may simply be referred to as "terminal", and "transmission management system" may simply be referred to as "management system". Also, any given one of the plurality of terminals 10*aa*-10*ac*, 10*ba*-10*bc*, 10*ca*-10*cc*, and 10*da*-10*dc* may simply be referred to as "terminal 10"; any given one of the plurality of displays 120*aa*-120*ac*, 120*ba*-120*bc*, and 120*ca*-120*cc* may simply be referred to as "display 120"; and any given one of the plurality of relay apparatuses 30*a*-30*e* may simply be referred to as "relay apparatus 30".

The terminal 10 transmits/receives image data and audio data as content data. That is, in a call session of the present embodiment, not only audio data but also image data can be exchanged. However, in some embodiments, the terminal 10 may not transmit/receive image data and may only transmit/receive audio data, for example.

In the present embodiment, the terminal 10 may support at least one video codec (encoder/decoder) conforming to a video encoding/decoding scheme, but the terminal 10 may also be a terminal that does not support any video codecs. The same applies with respect to an audio codec; that is, the terminal 10 may or may not support at least one audio codec.

Also, note that in the present embodiment, image data of a moving image (video) is described as an example of image data that is transmitted/received. However, an image being handled in the present embodiment is not limited to a moving image and may also include a still image in addition to or instead of a moving image, for example. The relay apparatus 30 relays image data and audio data to/from a plurality of terminals 10. The management system 50 centrally manages the terminals 10 and the relay apparatus 30.

The transmission system 1 of FIG. 1 also includes a plurality of routers 70*a*, 70*b*, 70*c*, 70*d*, 70*ab*, and 70*cd* that are configured to select an optimal path for image data and audio data. Note that in the following descriptions, any given one of the plurality of routers 70*a*, 70*b*, 70*c*, 70*d*, 70*ab*, and 70*cd* may simply be referred to as "router 70".

The program providing system 90 includes a HD (hard disk, not shown) that stores a terminal program for enabling the terminal 10 to implement various functions, and the program providing system 90 is configured to transmit the terminal program to the terminal 10. Also, the HD of the program providing system 90 stores a relay apparatus program for enabling the relay apparatus 30 to implement various functions, and the program providing system 90 is configured to transmit the relay apparatus program to the relay apparatus 30. Further, the HD of the program providing system 90 stores a transmission management program for enabling the management system 50 to implement various functions, and the program providing system 90 is configured to transmit the transmission management program to the management system 50.

The maintenance system 100 is a computer that is used for performing maintenance operations on at least one of the terminal 10, the relay apparatus 30, the management system 50, and the program providing system 90. For example, in a case where the maintenance system 100 is installed in Japan, and the terminal 10, the relay apparatus 30, the management system 50, and/or the program providing system 90 is installed outside Japan, the maintenance system 100 may remotely perform maintenance operations, such as maintenance/management of at least one of the terminal 10, the relay apparatus 30, the management system 50, and the program providing system 90, via a communication network 2. Also, the maintenance system 100 may perform maintenance operations, such as checking a model number, a serial number, and/or a vending destination of at least one of the terminal 10, the relay apparatus 30, the management system 50, and the program providing system 90 without using the communication network 2, for example.

Also, the terminals 10*aa*-10*ac*, the relay apparatus 30*a*, and the router 70*a* are interconnected by a LAN 2*a*. The terminals 10*ba*-10*bc*, the relay apparatus 30*b*, and the router 70*b* are interconnected by a LAN 2*b*. The LAN 2*a* and the LAN 2*b* are interconnected by a dedicated line 2*ab* including the router 70*ab*. The LAN 2*a* and the LAN 2*b*, and the dedicated line 2*ab* are configured within a certain region A. For example, the region A may be Japan, the LAN 2*a* may be configured within an office located in Tokyo, and the LAN 2*b* may be configured within an office located in Osaka.

The terminals 10*ca*-10*cc*, the relay apparatus 30*c*, and the router 70*c* are interconnected by a LAN 2*c*. The terminals 10*da*-10*dc*, the relay apparatus 30*d*, and the router 70*d* are interconnected by a LAN 2*d*. The LAN 2*c* and the LAN 2*d* are interconnected by a dedicated line 2*cd* including the router 70*cd*. The LAN 2*c*, the LAN 2*d*, and the dedicated line 2*cd* are configured within a certain region B. For example, the region B may be the United States, the LAN 2*c* may be configured within an office located in New York, and the LAN 2*d* may be configured within an office located in Washington D.C. Communication may be established between the regions A and B through the routers 70*ab* and 70*cd* that are interconnected via the Internet 2*i*.

The management system 50, the program providing system 90, and the maintenance system 100 are connected to the Internet 2*i* and are configured to establish communication with the terminal 10 and the relay apparatus 30 via the Internet 2*i*. The management system 50, the program providing system 90, and the maintenance system 100 may be installed in region A, region B, or some other region.

Also, the relay apparatus 30*e* is connected to the Internet 2*i* and is capable of establishing communication with the terminal 10 via the communication network 2. The relay apparatus 30*e* is constantly operating and is located in a region other than region A or region B such that it would be less likely to be affected by traffic within these local areas. Thus, when the terminal 10 calls another terminal 10 that is located within another local area, the relay apparatus 30*e* may be used to relay call data to/from these terminals. Also, when establishing a call between terminals 10 located within the same local area, if the relay apparatus 30 that is located in this local area is not operating, the relay apparatus 30*e* may be used as an emergency relay apparatus, for example.

In the present embodiment, the communication network 2 is established by the LAN 2*a*, the LAN 2*b*, the dedicated line 2*ab*, the Internet 2*i*, the dedicated line 2*cd*, the LAN 2*c*, and the LAN 2*d*. The communication network 2 may include areas where wired communication can be established as well as areas where wireless communication can be established, for example.

Note that the four digits indicated below each of the terminals 10, the relay apparatuses 30, the management system 50, the routers 70, the program providing system 90, and the maintenance system 100 in FIG. 1 represent an IP address based on the general IPv4 technology. For example, the IP address of the terminal 10*aa* is "1.2.1.3". Note that although the IPv6 technology may be used instead of the IPv4 technology, the IPv4 is used in the present example to simplify the illustrations.

<<Hardware Configuration>>

In the following, hardware configurations of the apparatuses and systems included in the transmission system 1 according to the present embodiment are described. Note that in the following descriptions, an example case is described where a delay occurs in the reception of image data at the terminal 10 corresponding to a relay destination such that the relay apparatus 30 changes the image resolution (image quality) of image data to be relayed before transmitting the image data to the terminal 10 corresponding to the relay destination.

Figure 32:
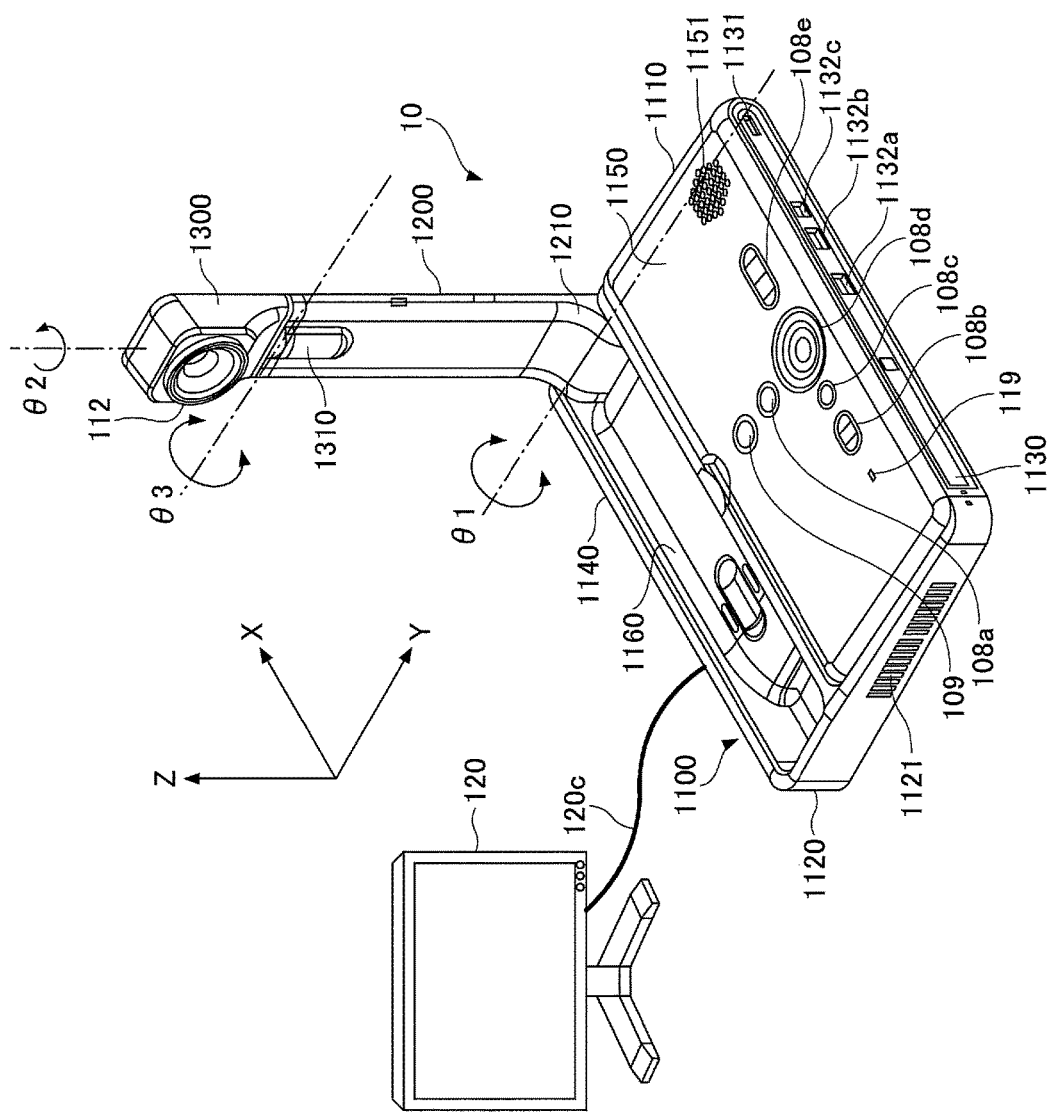
FIG. 32 is an external view of a transmission terminal according to an embodiment of the present invention.

FIG. 32 is an exemplary external view of the terminal 10 according to the present embodiment. Note that in the following, a longitudinal direction of the terminal 10 are referred to as "X-axis direction", a direction orthogonal to the X-axis direction within a horizontal plane is referred to as "Y-axis direction", and a direction orthogonal to the X-axis direction and the Y-axis direction (vertical direction) is referred to as "Z-axis direction".

In the example illustrated in FIG. 32, the terminal 10 includes a casing 1100, an arm 1200, and a camera housing 1300. An air inlet face including a plurality of air inlet holes (not shown) is arranged at a front side face of the casing 1100, and an exhaust face 1121 including a plurality of exhaust holes is arranged at a rear side wall 1120 of the casing 1100. In this way, when a cooling fan inside the casing 1100 is driven, external air at the front side of the terminal 10 may be introduced via the air inlet face (not shown) and discharged at the rear side of the terminal 10 via the exhaust face 1121. Also, an audio pickup hole 1131 is arranged at a right side wall 1130 of the casing 1100, and audio such as voice, sound, and noise may be picked up by built-in microphone 114 (described below).

An operation panel 1150 is arranged on a top face of the casing 1100 toward the right wall surface 1130. On the operation panel 1150, a plurality of operation buttons 108*a*-108*e* (described below), a power switch 109 (described below), an alarm lamp 119, and an audio output face 1151 including a plurality of audio output holes for passing audio output from a built-in speaker 115 (described below) are arranged. An accommodating portion 1160 corresponding to a concave portion for accommodating the arm 1200 and the camera housing 1300 is arranged on the top face of the casing 1100 toward a left side wall 1140. A plurality of connection ports 1132*a*-1132*c* for establishing electrical connection with an external device connection I/F 118 (described below) are arranged at the right side wall 1130 of the casing 1100. A connection port (not shown) for electrically connecting a cable 120*c* for the display 120 to the external device connection I/F 118 is arranged at the left side wall 1140 of the casing 1100.

Note that in the following descriptions, any given one of the plurality of operation buttons 108*a*-108*e* may simply be referred to as "operation button 108", and any given one of the plurality of connection ports 1132*a*-1132*c* may simply be referred to as "connection port 1132".

The arm 1200 is attached to the casing 1100 through a torque hinge 1210 so that the arm 1200 can rotate in up-down directions, within a tilt angle $\theta 1$ range of 135 degrees, with respect to the casing 1100. Note that FIG. 32 illustrates a state in which the tilt angle $\theta 1$ is 90 degrees. The camera 112 is built inside the camera housing 1300 and is capable of capturing images of users, documents, and the interior of a room, for example. Also, a torque hinge 1310 is arranged at the camera housing 1300. The camera housing 1300 is attached to the arm 1200 via the torque hinge 1310. The camera housing 1300 is configured to be rotatable horizontally within a panning angle $\theta 2$ range of ±180 degrees with respect to the state illustrated in FIG. 32, which state is assumed to be 0 degrees, and the camera housing 1300 is configured to be rotatable vertically within a tilt angle $\theta 3$ range of ±45 with respect to the arm 1200.

Note that the relay apparatus 30, the management system 50, the program providing system 90, and the maintenance system 90 may each have external views that are substantially identical to the external view of a typical server computer. As such, descriptions of their external views are omitted.

Figure 2:
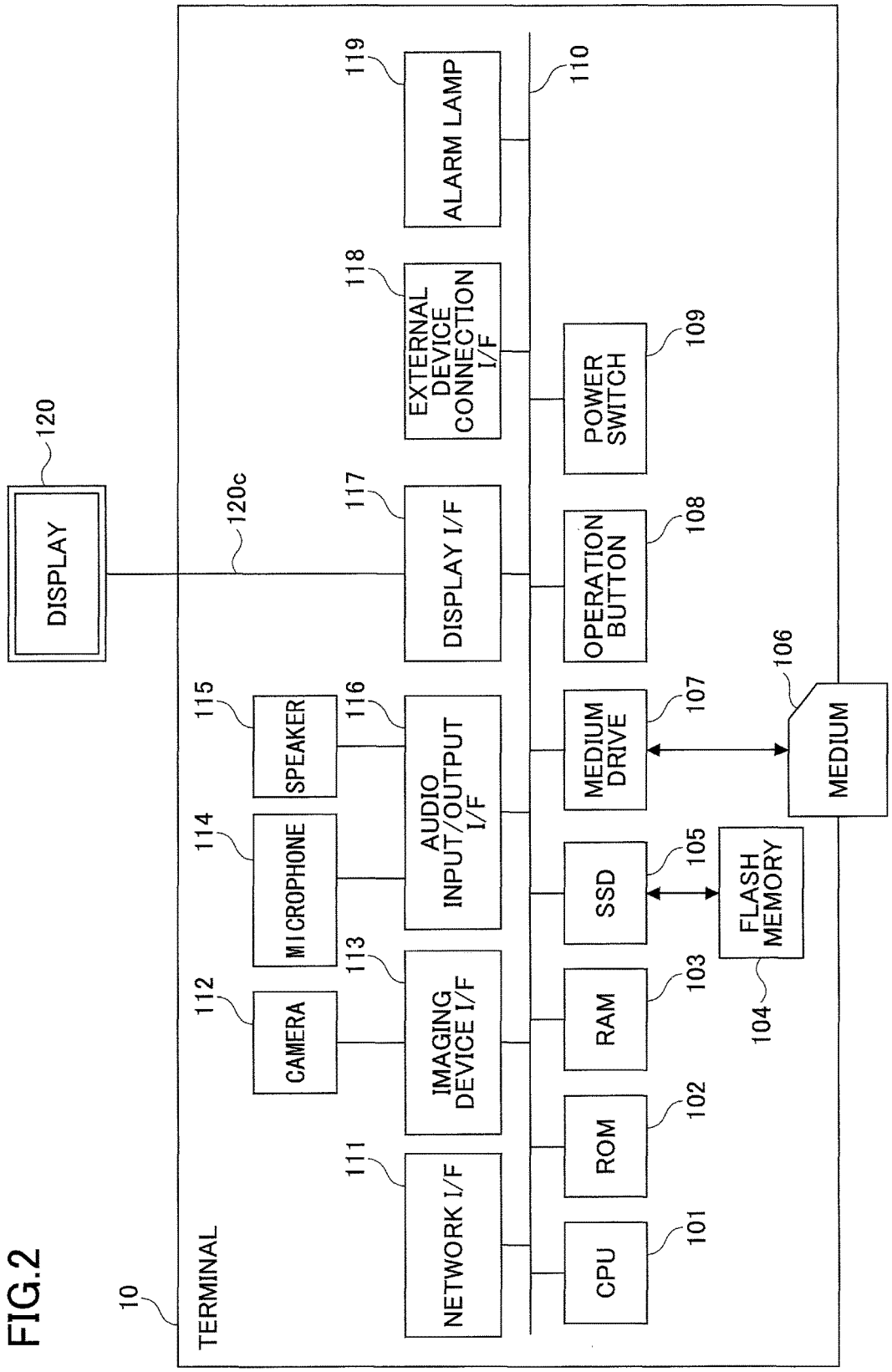
FIG. 2 is a block diagram illustrating an example hardware configuration of a transmission terminal according to an embodiment of the present invention.

FIG. 2 is a block diagram illustrating an example hardware configuration of the terminal 10 according to an embodiment of the present invention. In FIG. 2, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element I/F 113, the microphone 114, the speaker 115, an audio input/output I/F 116, a display I/F 117, the external device connection I/F 118, and the alarm lamp 119 that are connected to each other by a bus 110.

The CPU 101 controls overall operations of the terminal 10. The ROM 102 stores a terminal program, for example. The RAM 103 is used as a work area by the CUP 101. The flash memory 104 stores various types of data, such as image data and audio data. The SSD 105 controls data read/write operations on the flash memory 104 according to control by the CPU 101. The medium drive 107 controls read/write operations on a recording medium 106 such as a flash memory. The operation button 108 may be operated upon selecting a call destination of the call terminal 10, for example. The power switch 109 is for switching ON/OFF the power of the terminal 10. The network I/F 111 is connected to the communication network 2 and enables data communication using the communication network 2.

The camera 112 is configured to capture an image of an object according to control by the CPU 101 and obtain image data of the captured image. The imaging element I/F 112 is connected to the camera 12 and controls drive operations of the camera 112. The speaker 115 is a built-in speaker that outputs audio. The audio input/output I/F 116 is connected to the microphone 114 and the speaker 115 and controls input/output of audio signals to the microphone 114 and speaker 115 under control by the CPU 101. The display I/F 117 is connected to the external display 120 and is configured to transmit image data to the display 120 under control by the CPU 101. The external device connection I/F 118 is an interface for establishing connection with various external devices that are inserted into the connection ports 1132 illustrated in FIG. 32. The alarm lamp 119 is for signaling abnormalities of various functions of the terminal 10. The bus 110 may be an address bus or a data bus for establishing electrical connection between the various components illustrated in FIG. 2, for example.

The display 120 may include a liquid crystal display (LCD) or an organic electroluminescence (EL) display for displaying an image of an object or an operation icon, for example. The display 120 is connected to the display I/F 117 via the cable 120c. The cable 120c may be an analog RGB (VGA) cable, a Component Video cable, a HDMI (High-Definition Multimedia Interface) cable, or a DVI (Digital Video Interactive) cable, for example.

The camera 112 includes a lens and a solid state imaging element that converts light into an electrical charge to digitize an image (video) of an object. The solid state imaging element may be a CMOS (Complementary Metal Oxide Semiconductor) sensor or a CCD (Charge Coupled Device) sensor, for example.

The external device connection I/F 118 may establish electrical connection with an external device such as an external camera, an external microphone, or an external speaker via a cable such as a USB (Universal Serial Bus) cable that is inserted into the connection port 1132 of the casing 1100 illustrated in FIG. 32, for example. In a case where an external camera is connected, the external device connection I/F 118 may prioritize drive operations of the external camera over the built-in camera 112 under control by the CPU 101. Similarly, in a case where an external microphone or an external speaker is connected, the external device connection I/F 118 may prioritize drive operations of the external microphone or the external speaker over the built-in microphone 114 or the built-in speaker 115 under control by the CPU 101.

Note that the recording medium 106 may be a removable recording medium that can be loaded in and ejected from the terminal 10. Also, although the flash memory 104 is illustrated as an example of a non-volatile memory on which data read/write operations are performed under control by the CPU 101, other types of non-volatile memories such as an EEPROM (Electrically Erasable and Programmable ROM) may be used instead of the flash memory 104, for example.

Figure 3:
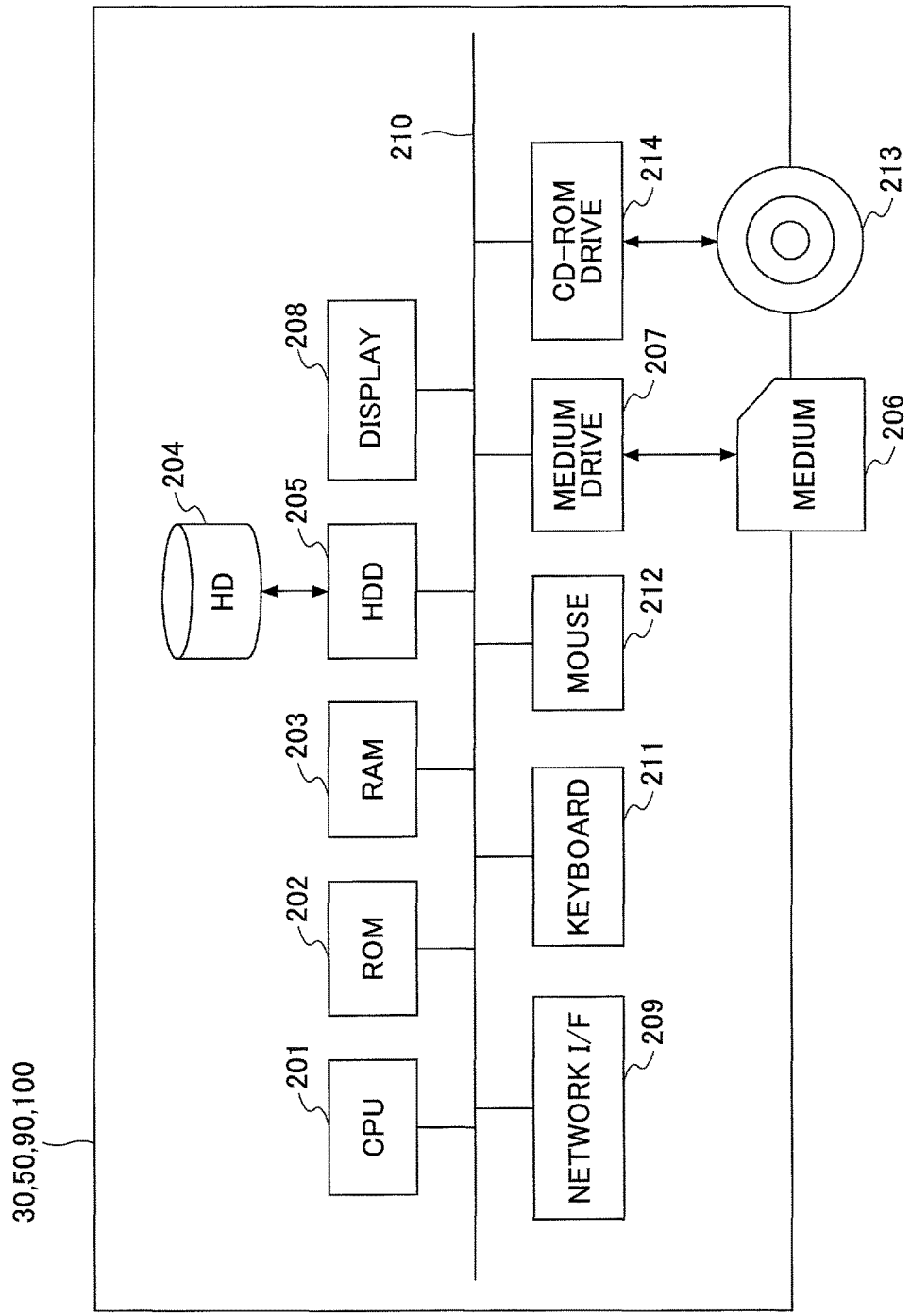
FIG. 3 is a block diagram illustrating an example hardware configuration of a transmission management system, a relay apparatus, a program providing system, or a maintenance system according to an embodiment of the present invention.

FIG. 3 is a block diagram illustrating an example hardware configuration of the management system 50. In FIG. 3, the management system 50 includes a CPU 201, a ROM 202, a RAM 203, a hard disk (HD) 204, a hard disk drive (HDD) 205, a medium drive 207, a display 208, a network I/F 209, a keyboard 211, a mouse 212, and a CD-ROM drive 214 that are connected to each other by a bus 210.

The CPU 201 controls overall operations of the management system 50. The ROM 202 stores a transmission management program to be executed by the CPU 201. The RAM 203 is used as a work area for the CPU 201. The HD 204 stores various types of data. The HDD 205 controls data read/write operations on the HD 204 under control by the CPU 201. The medium drive 207 controls data read/write operations on a recording medium 206 such as a flash memory. The display 208 displays various types of information such as a cursor, a menu, a window, characters, and/or an image, for example. The network I/F 209 is an interface for establishing data communication using the communication network 2. The keyboard 211 includes multiple keys for inputting characters, numeric values, and various commands, for example. The mouse 212 may be used to select and/or execute a command, select an object to be processed, or move a cursor, for example. The CD-ROM drive 214 controls data read/write operations on a CD-ROM (Compact Disc Read-Only Memory) 213, which is one example of a removable recording medium. The bus 210 may be an address bus or a data bus that is configured to establish electrical connection between the various components of the management system 50 illustrated in FIG. 3.

Note that the transmission management program may be stored as a file in an installable format or an executable format in a computer-readable recording medium, such as the recording medium 206 or the CD-ROM 213, to be distributed, for example.

Also, note that the relay apparatus 30 may have a hardware configuration substantially identical to that of the management system 50, and as such, a description thereof is omitted. However, the ROM 202 of the relay apparatus 30 stores a relay apparatus program for controlling the relay apparatus 30. The relay apparatus program may similarly be stored as a file in an installable format or an executable format in a computer-readable recording medium, such as the recording medium 206 or the CD-ROM 213, to be distributed, for example.

Further, the program providing system 90 may have a hardware configuration substantially identical to that of the management system 50, and as such, a description thereof is omitted. However, the ROM 202 of the program providing system 90 stores a program providing program for controlling the program providing system 90. The program providing program may similarly be stored as a file in an installable format or an executable format in a computer-readable recording medium, such as the recording medium 206 or the CD-ROM 213, to be distributed, for example.

Also, the maintenance system 100 may have a hardware configuration substantially identical to that of the management system 50, and as such, a description thereof is omitted. However, the ROM 202 of the maintenance system 100 stores a maintenance program for controlling the maintenance system 100. The maintenance program may similarly be stored as a file in an installable format or an executable format in a computer-readable recording medium, such as the recording medium 206 or the CD-ROM 213, to be distributed, for example.

Note that other examples of removable recording media that may be used to store programs and data in the present embodiment include a CD-R (Compact Disc Recordable), a DVD (Digital Versatile Disk), a Btu-ray Disc, and other various types of computer-readable recording media.

<<Functional Configuration>>

Figure 4:
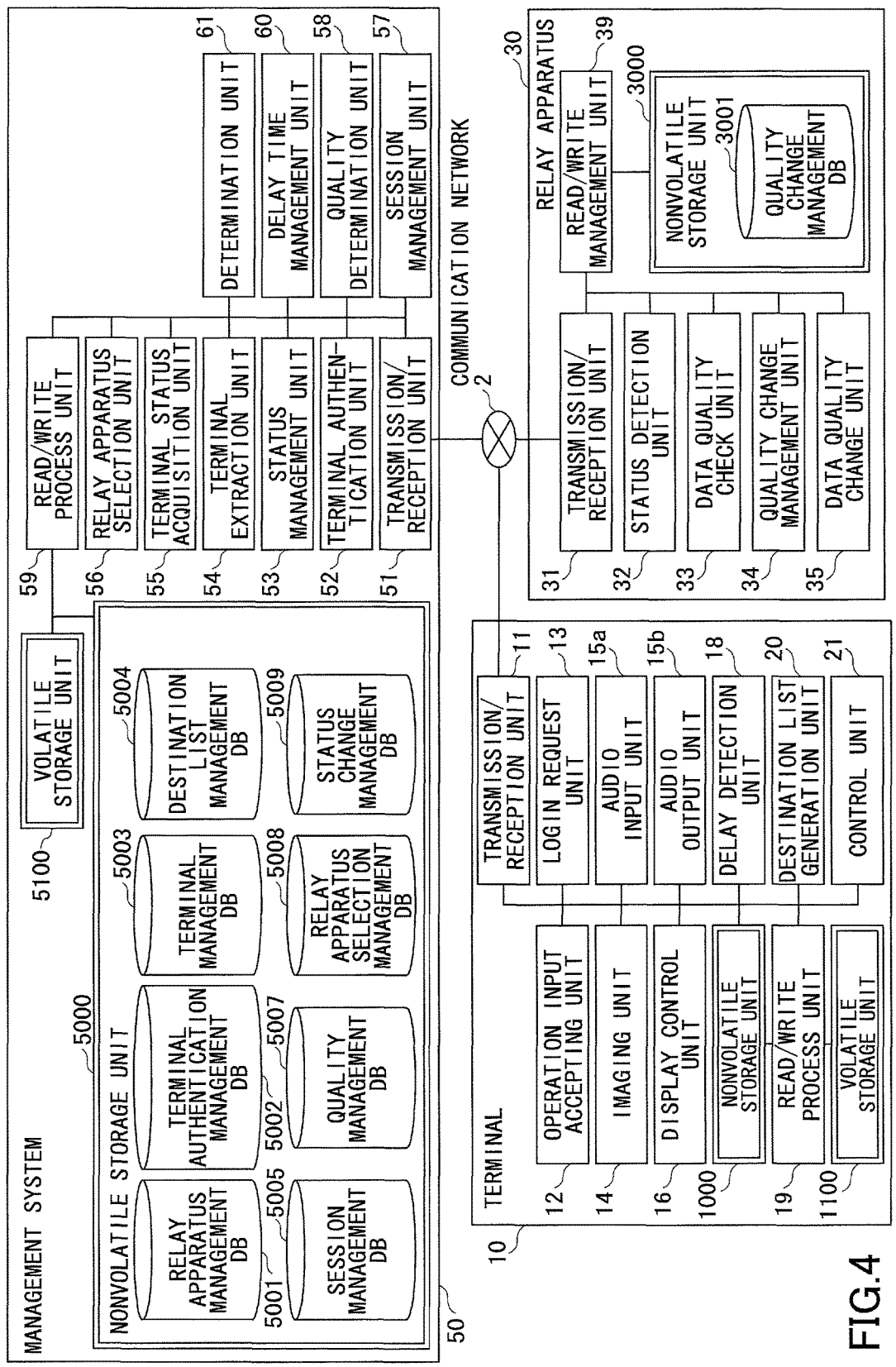
FIG. 4 is a block diagram illustrating example functional configurations of the transmission terminal, the relay apparatus, and the transmission management system included in the transmission system according to an embodiment of the present invention.

In the following, an example functional configuration of the transmission system 1 according to the present embodiment is described. FIG. 4 is a block diagram illustrating example functional configurations of the terminal 10, the relay apparatus 30, and the management system 50 that are included in the transmission system 1 of the present embodiment. In FIG. 4, the terminal 10, the relay apparatus 30, and the management system 50 are connected to each other via the communication network 2 such that they may exchange data with each other. Note that in FIG. 4, illustrations of the program providing system 90 and maintenance system 100 of FIG. 1 are omitted for the sake of simplicity because they are not directly involved in establishing communication for a video conference according to the present embodiment.

<Functional Configuration of Terminal>

The terminal 10 includes a transmission/reception unit 11, an operation input accepting unit 12, a login request unit 13, an imaging unit 14, an audio input unit 15a, an audio output unit 15b, a display control unit 16, a delay detection unit 18, a read/write process unit 19, a destination list generation unit 20, and a control unit 21. The above units may be implemented by one or more of the hardware elements of the terminal 10 illustrated in FIG. 2 operating under control by the CPU 101 based on a program stored in the ROM 102. The terminal 10 also includes a volatile storage unit 1100 that is configured by the RAM 103 of FIG. 2 and a nonvolatile storage unit 1000 that is configured by the flash memory 104 of FIG. 2.

<Functional Units of Terminal>

In the following, each of the functional units of the terminal 10 is described detail. The transmission/reception unit 11 of the terminal 10 is implemented by the network I/F 111 of FIG. 2 and is configured to transmit/receive various types of data (information) to/from another terminal, apparatus, or system via the communication network 2. The transmission/reception unit 11 starts receiving status information indicating the status of each terminal corresponding to a destination candidate from the management system 50 before starting a call to a desired destination terminal. Note that the status information may indicate the operation status ("Online" or "Offline") of each terminal 10, and if the operation status of the terminal 10 is "Online", further detailed information, such as the communication status indicating whether the terminal 10 is busy or on standby, for example. Also, in addition to the operation status, the status information may further indicate other statuses of the terminal 10 such as a status indicating that a cable is disconnected from the terminal 10, a status indicating that the terminal 10 is able to output audio but not an image, or a status indicating that the terminal 10 cannot output audio (mute), for example. Note that in the following, an example case where the status information indicates that the terminal 10 is operating ("Online") is described.

The transmission/reception unit 11 provides information on one or more codecs supported by the terminal 10 to the management system 50 when logging into the management system 50 or requesting the management system 50 to start a call, for example.

The operation input accepting unit 12 is implemented by the operation button 108 and the power switch 109 of FIG. 2 and is configured to accept various inputs by the user. For example, when the user turns on the power switch 109 of FIG. 2, the operation input accepting unit 12 of FIG. 4 accepts the power-on operation by the user and turns on the power of the terminal 10.

The login request unit 13 is implemented by an instruction from the CPU 101 of FIG. 2 and is configured control the transmission/reception unit 11 to automatically transmit to the management system 50, via the communication network 2, login request information indicating a request to login and the current IP address of the terminal 10 corresponding to the requesting terminal, in response to accepting the above power-on operation. Also, when the user turns off the power switch 109 from the power-on state, the transmission/reception unit 11 transmits, to the management system 50, status information indicating the power-off status of the terminal 10, and the operation input accepting unit 12 turns off the power of the terminal 10 thereafter. In this way, the management system 50 may be informed that the operation status of the terminal 10 has changed from power-on to power-off.

The imaging unit 14 is implemented by an instruction from the CPU 101 of FIG. 2 and the camera 112 and the imaging element I/F 113 of FIG. 2. The imaging unit 14 is configured to capture an image of an object and output image data of the captured image. The audio input unit 15a is implemented by the audio input/output I/F 116 of FIG. 2. After the microphone 114 converts the voice of a user into an audio signal, the audio input unit 15a inputs audio data relating to the audio signal. The audio output unit 15b is implemented by an instruction from the CPU 101 of FIG. 2 and the audio input/output I/F 116 of FIG. 2. The audio output unit 15b outputs audio data relating to an audio signal to the speaker 115 and controls the speaker 115 to output audio.

The display control unit 16 is implemented by the display I/F 117 of FIG. 2 and is configured to control operations for transmitting image data to the external display 120. Before the terminal 10 corresponding to a requesting terminal starts a video conference call with the terminal 10 corresponding to a desired destination, the display control unit 16 controls the display 120 to display a destination list including destination names of destination candidates based on status information of the destination candidates that is received after the transmission/reception unit 11 starts receiving the status information from the management system 50.

Figure 24:
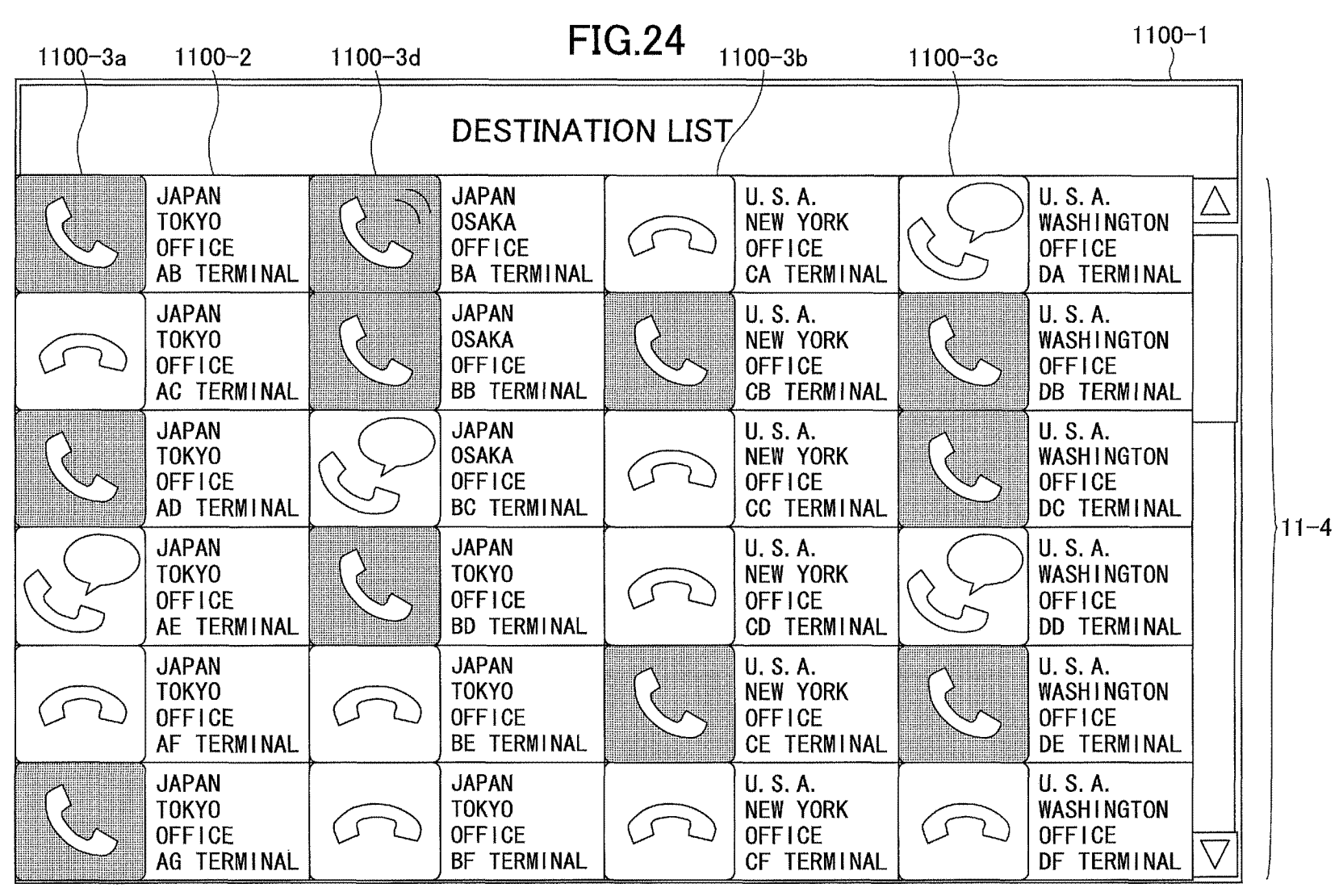

For example, the display control unit 16 may display a destination list frame 1100-1 as illustrated in FIG. 24 on the display 120. The destination list frame 1100-1 displays the destination name of each destination candidate, such as "Japan Tokyo Office AB Terminal" 1100-2, and a corresponding icon (1100-3a, 1100-3b, 1100-3c, or 1100-3d) indicating the status of each destination candidate based on the status information. Note that the icon 1100-3a indicates that a terminal corresponding to one of the destination candidates is online and on standby such that a call can be established with the terminal. The icon 1100-3b indicates that a terminal corresponding to one of the destination candidates is offline such that a call cannot be established with the terminal. The icon 1100-3c indicates that a terminal corresponding to one of the destination candidates is, online and is calling another terminal such that joining the call to establish a three-way call is possible. The icon 1100-3d indicates that a terminal corresponding to one of the destination candidates is making a call request to another terminal or that another terminal is making a call request to the terminal such that a call cannot be established with the terminal. Further, in addition to the above status, the icon 1100-3d indicates that the terminal corresponding to one of the destination candidates has authorized the call request from the other terminal or that the other terminal has authorized the call request from the terminal such that a call cannot be established with the terminal. Also, the destination list frame 1100-1 displays a scroll bar 1100-4 at the right-hand side. By selecting an upward triangle icon or a downward triangle icon of the scroll bar 1100-4, destination names and icons indicating the status of destination candidates that are not displayed in FIG. 24 may be displayed on the display 120.

The delay detection unit 18 is implemented by an instruction from the CPU 101 of FIG. 2 and is configured to detect a reception delay time (ms) of image data or audio data transmitted to the terminal 10 from another terminal 10 via the relay apparatus 30.

The read/write process unit 19 may be implemented by an instruction from the CPU 101 and the SSD 105 of FIG. 2, for example. The read/write process Unit 19 is configured to execute processes of storing various data in the nonvolatile storage unit 1000 and reading various data stored in the nonvolatile storage unit 100. The nonvolatile storage unit 1000 may store a terminal ID for identifying the terminal 10 and a password, for example. Further, the read/write process unit 19 is configured to execute processes of storing various data in the volatile storage unit 1100 and reading various data stored in the volatile storage unit 1100. The volatile memory 1100 may be configured to store image data and audio data received from a destination terminal and overwrite the image data and audio data each time a new set of image data and audio data is received from the destination terminal during a call, for example. Note that an image is displayed on the display 120 based on the image data before being overwritten, and audio is output by the speaker 115 based on the audio data before being overwritten.

The destination list generation unit 20 generates and updates a destination list, such as that illustrated in FIG. 24, including icons indicating the status of each destination candidate, based on destination list information (described below) and status information of each of terminal 10 corresponding to a destination candidate received from the management system 50.

The control unit 21 makes a request to the management system 50 to start a conference in response to a user operation. Note that a conference (call) according to the present embodiment includes a one-to-one call and a multipoint conference (call) with three or more participating terminals, for example.

The control unit 21 encodes content data, such as video and audio, using an encoder corresponding to a decoder that is supported by a counterpart terminal 10 that is participating in the conference and transmits the encoded content data to the counterpart terminal 10 via the relay apparatus 30.

The control unit 21 decodes content data, such as video and audio, that is received from the counterpart terminal 10 participating in the conference and controls a screen or a speaker to output the decoded content data, for example. In a case where a multipoint conference is held between at least three terminals 10, the control unit 21 decodes each set of content data, such as video and audio, received from each of the counterpart terminals 10 participating in the conference and displays each set of decoded content data on a screen, for example.

Also, when the control unit 21 receives codec correspondence information (described below) from the management system 50, the control unit 21 displays information based on the codec correspondence information on the screen (see FIG. 19). When the control unit 21 accepts an approval operation from the user via the screen, the control unit 21 sends a corresponding approval notification to the management system 50. When the control unit 21 accepts a cancellation operation from the user via the screen, the control unit 21 sends a corresponding cancellation notification to the management system 50.

Note that in some embodiments, the control unit 21 may be configured to determine whether there is any destination terminal 10 that would be unable to transmit/receive content data based on the codec correspondence information received from the management system 50, and if no problems are found (i.e., there is no destination terminal 10 that would be unable to transmit/receive content data), the control unit 21 may automatically send an approval notification to the management system 50 without accepting an approval operation from the user, for example. In this case, the control unit 21 may only display the information based on the codec correspondence information on the screen if there is a destination terminal 10 that is unable to transmit/receive data.

Also, in some embodiments, the control unit 21 may be configured to determine whether there is any destination terminal 10 that is unable to transmit/receive data, and if there is such destination terminal 10, the control unit 21 may automatically send a cancellation notification to the management system 50, for example.

Note that the terminal ID and a relay apparatus ID (described below) used in the present embodiment correspond to identification information, such as language, characters, symbols, and/or various marks used to uniquely identify the terminal 10 or the relay apparatus 30. Further, the terminal ID and the relay apparatus ID may be identification information combining at least two of the above language, characters, symbols, and various marks, for example.

<Functional Configuration of Relay Apparatus>

In the following, the functional configuration of the relay apparatus 30 is described. The relay apparatus 30 includes a transmission/reception unit 31, a status detection unit 32, a data quality check unit 33, a quality change management unit 34, a data quality change unit 35, and a read/write process unit 39. The above units may be implemented by one or more of the hardware elements of the relay apparatus 30 illustrated in FIG. 3 operating under control by the CPU 201 based on a program stored in the ROM 202. The relay apparatus 30 also includes a nonvolatile storage unit 3000 configured by the HD 204 of FIG. 3 that is capable of maintaining various data and information stored therein even when the power of the relay apparatus 30 is turned off.

(Quality Change Management Table)

The nonvolatile storage unit 3000 stores a quality change management DB (database) 3001 that is configured by a quality change management table as illustrated in FIG. 5, for example. The quality change management table associates an IP address of a terminal 10 corresponding to a relay destination of image data with a corresponding image quality of image data to be relayed by the relay apparatus 30 to the relay destination.

In the following, varying image resolutions of image data handled in the present embodiment are described with reference to FIGS. 6A-6C.

Figure 6:
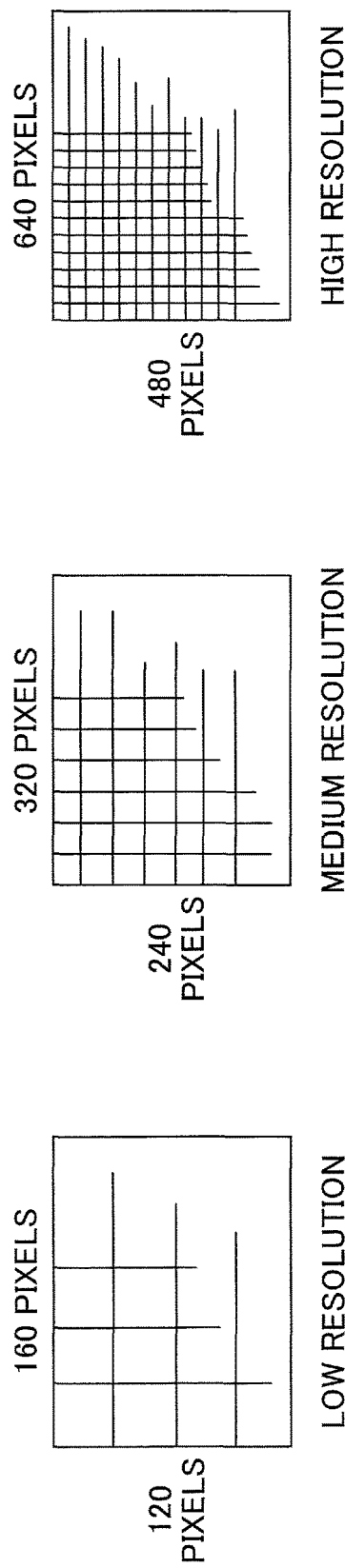
FIGS. 6A-6C are diagrams illustrating varying image qualities of image data.

FIG. 6A illustrates a 160×120 pixels (160 pixels wide, 120 pixels high) low-resolution image as a base image; FIG. 6B illustrates a 320×240 pixels (320 pixels wide, 240 pixels high) medium-resolution image; and FIG. 6C illustrates a 640×480 pixels (640 pixels wide, 480 pixels high) high-resolution image. In the case of relaying image data using a narrow band, low-quality image data only including the low-resolution image data corresponding to the base image is relayed. In the case where a relatively wide band is used, medium-quality image data including the low-resolution image data corresponding to the base image and of the medium-resolution image are relayed. In the case where a substantially wide band is used, high-quality image data including the low-resolution image data, the medium-resolution image data, and the high-resolution image are relayed. For example, in the quality change management table of FIG. 5, if the relay apparatus 30 is to relay image data to a destination terminal with the IP address "1.3.2.4", high-quality image data is relayed by the relay apparatus 30.

<Functional Units of Relay Apparatus>

In the following, the functional units of the relay apparatus 30 are described in detail. Also, relationships between the functional units and the hardware elements of the relay apparatus 30 as illustrated in FIG. 3 for implementing these functional units are described.

The transmission/reception unit 31 of the relay apparatus 30 of FIG. 4 is implemented by the network I/F 209 of FIG. 3 and is configured to transmit/receive various types of data (information) to/from another terminal, apparatus, or system via the communication network 2. The status detection unit 32 is implemented by an instruction from the CPU 201 of FIG. 3 and is configured to detect the operation status of the relay apparatus 30 that includes the status detection unit 32. The operation status detected by the status detection unit 32 may be "Online", "Offline", or "Out of Service", for example.

The data quality check unit 33 is implemented by an instruction from the CPU 201 of FIG. 3 and is configured to check the image quality of image data to be relayed by searching the quality change management table (see FIG. 5) using the IP address of the destination terminal as a search key and extracting the corresponding image quality of the image data to be relayed. The quality change control unit 34 is implemented by an instruction from the CPU 201 of FIG. 3 and is configured to change the content of the quality change management table of the quality change management DB 3001 based on quality information (described below) that is transmitted from the management system 50. For example, while a video conference is held through transmission/reception of high-quality image data between the terminal 10aa with the terminal ID "01aa" as the requesting terminal and the terminal 10db with the terminal ID "01db" as the destination terminal, when another video conference is started via the communication network 2 between the terminal 10bb as the requesting terminal and the terminal 10ca as the destination terminal, for example, a delay may occur in the reception of image data at the terminal 10db corresponding to the destination terminal. In such case, the relay apparatus 30 has to lower the image quality of the image data being relayed from high-quality to medium-quality. Thus, based on quality information indicating medium-quality as the image quality of image data to be relayed, the quality change control unit 34 changes the content of the quality change management table of the quality change management DB 3001 such that the image quality of image data to be relayed to the destination terminal 10db by the relay apparatus 30 is degraded from high-quality to medium-quality.

The data quality change unit 35 is implemented by an instruction from the CPU 201 of FIG. 3 and is configured to change the image quality of image data transmitted from a transmitting terminal 10 based on the content of the quality change management table of the quality change management DB 3001 that has been changed. The read/write process unit 39 is implemented by the HDD 205 of FIG. 3 and is configured to execute processes of storing various data in the nonvolatile storage unit 3000 and reading various data stored in the nonvolatile storage unit 3000.

<Functional Configuration of Management System>

In the following, the functional configuration of the management system 50 is described. The management system 50 includes a transmission/reception unit 51, a terminal authentication unit 52, a status management unit 53, a terminal extraction unit 54, a terminal status acquisition unit 55, a relay apparatus selection unit 56, a session management unit 57, a quality determination unit 58, a read/write process unit 59, a delay time control unit 60, and a determination unit 61. The above functional units may be implemented by one or more of the hardware elements illustrated in FIG. 3 operating under control by the CPU 201 based on a program stored in the ROM 202 of the management system 50. The management system 50 further includes a nonvolatile storage unit 5000 configured by the HD 204 of FIG. 3 that can maintain various data and information stored therein even when the power of the management system 50 is turned off. The nonvolatile storage unit 5000 stores the destination list frame 1100-1 illustrated in FIG. 24. Further, the management system 50 includes a volatile storage unit 5100 that is configured by the RAM 203 of FIG. 3.

(Relay Apparatus Management Table)

The nonvolatile storage unit 5000 stores a relay apparatus management DB 5001 that is configured by a relay apparatus management table as illustrated in FIG. 7, for example. In the relay apparatus management table, each relay apparatus ID of each relay apparatus 30 is associated with a corresponding operation status of the relay apparatus 30, the reception date/time of status information indicating the operation status received at the management system 50, the IP address of the relay apparatus 30, and the maximum data transmission rate (Mbps) of the relay apparatus 30. For example, in the relay apparatus management table of FIG. 7, the relay apparatus 30a with the relay apparatus ID "111a" is indicated as being in the operation status "online", the reception date/time of the status information of the relay apparatus 30a received by the management system 50 is indicated as "2009.11.10.13:00" (Nov. 10, 2009, 13:00), the IP address of the relay apparatus 30a is indicated as "1.2.1.2", and the maximum data transmission rate of the relay apparatus 30a is indicated as "100 (Mbps)".

(Terminal Authentication Management Table)

Further, the nonvolatile storage unit 5000 stores a terminal authentication management DB 5002 that is configured by a terminal authentication management table as illustrated in FIG. 8, for example. In the terminal authentication management table, each terminal ID of each terminal 10 managed by the management system 50 is associated with a corresponding password. For example, in the terminal authentication management table of FIG. 8, the terminal 10aa with the terminal ID "01aa" is associated with the password "aaaa".

(Terminal Management Table)

Further, the nonvolatile storage unit 5000 stores a terminal management DB 5003 that is configured by a terminal management table as illustrated in FIG. 9, for example. In the device management table, each terminal ID of each terminal 10 managed by the management system 50 is associated with a corresponding destination name when the terminal 10 corresponds to a destination terminal, the operation status of the terminal 10, the communication status with another terminal, the reception date/time of login request information (described below) received at the management system 50, the IP address of the terminal 10, and information on codecs (encoders, decoders) supported by (compatible with) the terminal 10. For example, in the terminal management table of FIG. 9, the destination name of the terminal 10aa with the terminal ID "01aa" is indicated as "Japan Tokyo Office AA Terminal", the operation status of the terminal 10aa is indicated as "online", the communication status of the terminal 10aa with another terminal is indicated as "None", which means the terminal 10aa is not communicating with any other terminal and is on standby mode, the reception date/time of login request information received at management system 50 is indicated as "2009.11.10.13:40"

(Nov. 10, 2009, 13:40), and the IP address of the terminal 10aa is indicated as "1.2.1.3". Also, the codecs supported by the terminal 10aa include the video encoder "H.264", the audio encoder "Speex", the video decoder "H.264", and the audio decoder "Speex". Note that possible communication statuses of the terminal 10 include "Calling", which indicates that the terminal 10 is calling another terminal, "Ringing", which indicates that the terminal is being called by another terminal, "Accepted", which indicates that the terminal 10 has authorized a call requested by another terminal or that another terminal has authorized a call requested by the terminal 10, and "Busy", which indicates that the terminal 10 is in a call session (communicating) with another terminal, for example.

(Destination List Management Table)

Further, the nonvolatile storage unit 5000 stores a destination list management DB 5004 that is configured by a destination list management table as illustrated in FIG. 10, for example. In the destination list management table, each terminal ID of each terminal 10 that may be a requesting terminal making a request to start a video conference call is associated with the terminal IDs of all corresponding destination terminal candidates registered as destination candidates for the requesting terminal. For example, according to the destination list management table of FIG. 10, destination terminal candidates to which the terminal 10aa with the terminal ID "01aa" as the requesting terminal can send a start request to start a video conference call include the terminal 10ab with the terminal ID "01ab", the terminal 10ba with the terminal ID "01ba", and the terminal 10bb with the terminal ID "01bb", for example. Note that the destination list management table may be updated by adding/deleting one or more destination terminal candidates that are registered in association with a given requesting terminal based on an addition/deletion request that is sent from the requesting terminal to the management system 50, for example.

(Session Management Table)

Also, the nonvolatile storage unit 5000 stores a session management DB 5005 that is configured by a session management table as illustrated in FIG. 11, for example. In the session management table, each session ID for identifying a session in which call data is exchanged between terminals is associated with the relay apparatus ID of the relay apparatus 30 that is used to relay image data and audio data to/from the terminals, the terminal ID of the requesting terminal, the terminal ID of the destination terminal, the reception delay time (ms) of the image data being received at the destination terminal, and the reception date/time of delay information indicating the delay time that is transmitted from the destination terminal and received at the management system 50. For example, according to the session management table of FIG. 11, the relay apparatus 30a with the relay apparatus ID "111a" is used in the session with the session ID "set" to relay image data and audio data to/from the terminal 10aa with the terminal ID "01aa" as the requesting terminal, and the terminal 10bb with the terminal ID "01bb", the terminal 10cb with the terminal ID "01cb", and the terminal 10db with the terminal ID "01db" as destination terminals. Also, according to the session management table of FIG. 11, the reception delay time of the image data received by the destination terminal (terminal 10db) at "2009.11.10.14:00" (Nov. 10, 2009, 14:00) is "200 (ms)". Note that in a case where a video conference is held between two terminals 10, the session management table may manage the delay information reception data/time based on the reception date/time of delay information that is transmitted from the requesting terminal rather than the destination terminal. However, when a video conference is held between three or more terminals 10, the delay information reception date/time is managed based on the reception date/time of delay information that is transmitted from the terminal 10 receiving image data and audio data.

(Quality Management Table)

Also, the nonvolatile storage unit 5000 stores a quality control DB 5007 that is configured by a quality management table as illustrated in FIG. 12, for example. In the quality control table, the delay time (ms) of image data received at a requesting terminal or a destination terminal is associated with the corresponding image quality of image data to be relayed by the relay apparatus 30.

(Relay Apparatus Selection Management Table)

Further, the nonvolatile storage unit 5000 stores a relay apparatus selection management DB 5008 that is configured by a relay apparatus selection management table as illustrated in FIG. 13, for example. In the relay apparatus selection management table, each terminal ID of each terminal 10 that is managed by the management system 50 is associated with the relay apparatus ID of the relay apparatus 30 that is used to relay image data and audio data to/from the terminal 10.

(Status Change Management Table)

Further, the nonvolatile storage unit 5000 stores a status change management DB 5009 that is configured by status change management tables as illustrated in FIGS. 14, 15, and 16, for example. In the status change management table of FIG. 14, change request information indicating a request to change the communication status of a terminal is stored in association with before-change status information indicating the communication status of the terminal before the change has been implemented by the status management unit 53 and change information indicating the communication status of the terminal after the change has been implemented by the status management unit 53. In the status change management table of FIG. 15, the change request information is associated with terminal information identifying a terminal as a requesting terminal or a destination terminal, before-change status information of the corresponding terminal, and change information of the corresponding terminal. In the status change management table of FIG. 16, the change request information is associated with terminal information, determination information, before-change status information, and change information. The determination information indicates the determination result of a determination that is made when a requesting terminal receives change request information "Reject" from one or more of a plurality of destination terminals in response to change request information "Invite" that has been transmitted to the plurality of destination terminals. That is, the determination information indicates whether the requesting terminal has received the change request information "Reject" from all of the plurality of destination terminals or a part of the destination terminals. Note that the change request information "Invite" indicates a request to start a conference (communication), and "Reject" indicates a rejection of the conference start request. Also, the change request information may include "Accept" indicating acceptance (authorization) of the conference start request, "Cancel" indicating cancellation of the conference start request, "Call" indicating a request to start relaying call data, "Join" indicating a request to participate in a session that has already been established between two or more terminals, and "Leave" indicating a request to leave the conference and end communication, for example.

<Functional Units of Management System>

In the following, the functional units of the management system 50 are described in detail. Also, the relationships between the above functional units of the management system 50 and the hardware elements of FIG. 3 that are operated to implement these functional units are described.

The transmission/reception unit 51 is implemented by the network I/F 209 of FIG. 3 and is configured to transmit/receive various data (information) to/from another terminal, apparatus, or system via the communication network 2. The terminal authentication unit 52 performs terminal authentication by searching the terminal authentication management table (see FIG. 8) of the nonvolatile storage unit 5000 using a terminal ID and password included in login request information received via the transmission/reception unit 51 as a search key and determining whether the same terminal ID and password are managed in the terminal authentication management table.

The status management unit 53 manages the operation status of a requesting terminal that sends login request information to the management system 50 in the terminal management table (see FIG. 9). Specifically, the status management unit 53 stores and manages the terminal ID of the requesting terminal, the operation status of the requesting terminal, the reception date/time of the login request information at the management system 50, and the IP address of the requesting terminal in association with each other. For example, when the user of a terminal 10 switches the operation status of the power switch 109 from off to on, the terminal 10 transmits status information indicating that the power of the terminal 10 is to be turned on to the status management unit 53. Based on such status information received from the terminal 10, the status management unit 53 sets the information indicating the operation status of the terminal 10 in the terminal management table (see FIG. 9) from "Offline" to "Online". Also, when the user of a terminal 10 switches the operation status of the power switch 109 from on to off, the terminal 10 transmits status information indicating that the power of the terminal 10 is to be turned off. Based on such status information received from the terminal 10, the status management unit 53 sets the information indicating the operation status of the terminal 10 in the terminal management table (see FIG. 9) from "Online" to "Offline".

When the transmission/reception unit 51 receives change request information that is transmitted from a requesting terminal or a destination terminal, the status management unit 53 acquires status information of at least one of the requesting terminal and the destination terminal from the terminal management table (see FIG. 9).

Based on the change request information received by the transmission/reception unit 51, the status management unit 53 changes the information indicating the operation status of at least one of the requesting terminal and the destination terminal managed in the terminal management table (see FIG. 9).

The terminal extraction unit 54 searches the destination list management table (see FIG. 10) using the terminal ID of a requesting terminal that has made a login request and extracts (reads) one or more terminal IDs of destination terminal candidates that are capable of establishing a call with the requesting terminal. Also, the terminal extraction unit 54 searches the destination list management table using the terminal ID of the requesting terminal that has made the login request as a search key to extract the terminal IDs of other requesting terminals that have the terminal ID of the above requesting terminal registered as a destination terminal candidate.

The terminal status acquisition unit 55 searches the terminal management table (see FIG. 9) using the terminal IDs of the destination terminal candidates extracted by the terminal extraction unit 54 as search keys to extract the corresponding operation statuses of the terminals with the terminal IDs extracted by the terminal extraction unit 54. In this way, the terminal status acquisition unit 55 can acquire the operation statuses of the destination terminal candidates that are capable of establishing a call with the requesting terminal that has made the login request. Also, the terminal status acquisition unit 55 searches the terminal management table using the terminal IDs extracted by the terminal extraction unit 54 as search keys to acquire the operation statuses of the requesting terminal that has made the login request.

The relay apparatus selection unit 56 performs a process of ultimately selecting one relay apparatus 30 from a plurality of relay apparatuses 30. Specifically, the relay apparatus selection unit 56 generates a session ID for identifying a session in which call data is to be exchanged between terminals. Based on the terminal ID of a requesting terminal and the terminal ID of a destination terminal that are included in start request information that has been transmitted to the management system 50 from the requesting terminal, the relay apparatus selection unit 56 searches the relay apparatus selection management table (see FIG. 13) to extract corresponding relay apparatus terminal IDs that are associated with the terminal IDs. The relay apparatus selection unit 56 then refers to the relay apparatus management table (see FIG. 7) to select the relay apparatus ID of a relay apparatus 30 with the operation status indicated as "Online" from among the extracted relay apparatus IDs.

The session management unit 57 stores and manages the session ID generated by the relay apparatus selection unit 56, the terminal ID of the requesting terminal, and the terminal ID of the destination terminal in association with each other in the session management table (see FIG. 11) of the nonvolatile storage unit 5000. Also, the session management unit 57 stores and manages the relay apparatus ID of the relay apparatus 30 that has ultimately been selected for each session ID stored in the session management table.

The quality determination unit 58 determines the image quality of image data to be relayed by the relay apparatus 30 by searching the quality management table (see FIG. 12) using the delay time of image data as a search key and extracting the corresponding image quality for relaying the image data. The read/write process unit 59 is implemented by the HDD 205 of FIG. 3 and is configured to execute processes of storing various data in the nonvolatile storage unit 5000 and reading various data stored in the nonvolatile storage unit 5000.

The delay time management unit 60 searches the terminal management table (see FIG. 9) using the IP address of the destination terminal as a search key and extracts the corresponding terminal ID of the destination terminal. Further, based on the extracted terminal ID, the delay time management unit 60 stores and manages the delay time included in the delay information in the "delay time" field of a record including the extracted terminal ID in the session management table (see FIG. 11).

When the determination unit 61 receives a communication start request from a requesting terminal 10-1 (first terminal), the determination unit 61 performs a codec information correspondence information generation process based on information acquired from the session management DB 5005 and the terminal management DB 5003. The determination unit 61 then transmits the generated codec correspondence information (determination result) from the transmission/reception unit 51 to the requesting terminal 10-1.

More specifically, the determination unit 61 may implement the codec correspondence information generation process by the following process operations, for example.

The determination unit 61 refers to the session management DB 5005 to acquire the terminal ID of a terminal 10-2 (second terminal) corresponding to a communication counterpart of the requesting terminal 10-1. Note that in a case where the requesting terminal 10-1 is to join a conference that is already being held, one or more terminals that are already participating in the conference may correspond to the communication counterpart of the requesting terminal 10-1. In a case where the requesting terminal 10-1 is to start a new conference specifying one or more destination terminals, the designated one or more destination terminals may correspond to the communication counterpart of the requesting terminal 10-1. Further, note that in the case of joining a conference that has already started, the requesting terminal 10-1 may be configured to participate in the conference by specifying a conference ID (session ID) identifying the conference or by specifying the terminal ID of at least one terminal 10 that is participating in the conference, for example.

The determination unit 61 refers to the terminal management DB 5003 to acquire information on codecs supported by the requesting terminal 10-1 and information on codecs supported by the one or more terminals 10 corresponding to the conference counterpart of the requesting terminal 10-1.

FIG. 17 is a table illustrating an example of the codec correspondence information. The codec correspondence information lists, for each type of content data (e.g., video, audio), conference counterpart terminal(s) 10 that are unable to transmit the corresponding type of content data and conference counterpart terminal(s) 10 that are unable to receive the corresponding type of content data. The codec correspondence information of FIG. 17 indicates the destination names of terminal(s) 10 that are unable to transmit/receive content data under the corresponding fields "No Video Transmission", "No Video Reception", "No Audio Transmission", and "No Audio Reception".

The determination unit 61 determines whether content data can be transmitted from the requesting terminal 10-1 to the one or more conference counterpart terminals 10. Specifically, the determination unit 61 determines whether content data, such as video and audio, transmitted from the requesting terminal 10-1, can be decoded by a terminal 10 of the one or more conference counterpart terminals 10. If at least one decoder supported by the terminal 10 corresponds to an encoder supported by the requesting terminal 10-1, it may be determined that content data encoded by the encoder can be transmitted to and decoded by the terminal 10.

The determination unit 61 also determines whether the requesting terminal 10-1 can receive content data from the one or more conference counterpart terminals 10. Specifically, the determination unit 61 determines whether the requesting terminal 10 can decode content data, such as video and audio, transmitted from a terminal 10 of the one or more conference counterpart terminals 10. If the terminal 10 supports at least one encoder corresponding to a decoder supported by the requesting terminal 10-1, it may be determined that content data encoded by the encoder of the terminal 10 can be received and decoded by the requesting terminal 10-1.

Note that the codec correspondence information generation process is described in detail below.

Based on the codec correspondence information generated by the determination unit 61, the transmission/reception unit 51 determines, with respect to each type of content data (e.g., video, audio), whether there are any destination terminals 10 that are unable to transmit/receive the corresponding type of content data. Note that in some embodiments, if no problems are found (i.e., if there are no destination terminals 10 that are unable to transmit/receive content data), the transmission/reception unit 51 may be configured to perform a process of transmitting the communication start request from the requesting terminal 10-1 to the one or more conference counterpart terminals 10 without transmitting the codec correspondence information generated by the determination unit 61 to the requesting terminal 10-1, for example. In this case, the transmission/reception unit 51 may transmit the codec correspondence information generated by the determination unit 61 to the requesting terminal 10-1 only when there is a destination terminal 10 that is unable to transmit/receive content data, for example.

<<Process Operations>>

Figure 18:
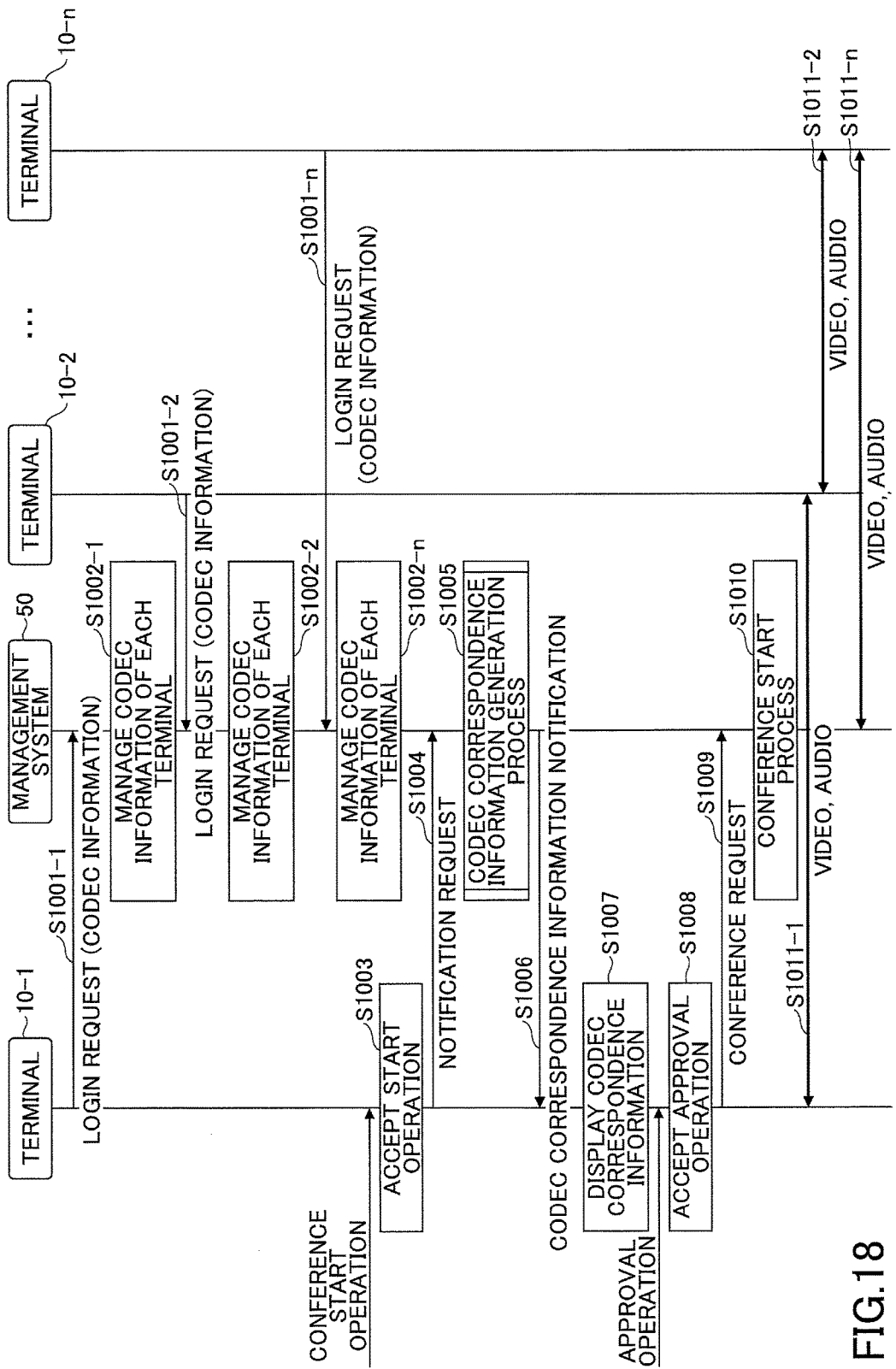
FIG. 18 is a sequence chart illustrating an example process for providing notification of codec correspondence information.

In the following, example process operations for providing notification of the codec correspondence information in the transmission system 1 according to an embodiment of the present invention are described with reference to FIG. 18. FIG. 18 is a sequence chart illustrating example process operations for providing notification of the codec correspondence information in the transmission system 1 according to the present embodiment.

In steps S1001-1 through S1001-*n*, terminals 10-1 through 10-*n* respectively send a login request including codec information to the management system 50 to notify the management system 50 of the codecs supported by the respective terminals 10-1 through 10-*n*.

In steps S1002-1 through S1002-*n*, the management system 50 stores and manages the terminal IDs of the terminal 10-1 through 10-*n* and codec information indicating the codecs supported by the terminals 10-1 through 10-*n* in association with each other in the terminal management DB 5003.

When the terminal 10-1 accepts a start operation for starting a conference from a user (step S1003), the terminal 10-1 sends a notification request to the management system 50 requesting for codec correspondence information that can be used in the conference (step S1004). The notification request includes information specifying the conference, such as a conference ID for identifying the conference, the terminal ID of a terminal participating in the conference, or the terminals ID of one or more destination terminals to be invited to participate in the conference, for example.

In step S1005, the management system 50 performs the codec correspondence information generation process, and in step S1006, the management system 50 notifies the terminal 10-1 of the generated codec correspondence information.

In step S1007, the terminal 10-1 displays information on a screen based on the codec correspondence information. When the terminal 10-1 accepts an approval operation from the user (step S1008), the terminal 10-1 transmits a conference request (communication start request) to the management system 50 (step S1009).

In step S1010, the management system 50 performs a conference start process that involves transmitting the conference request from the terminal 10-1 to the conference counterpart terminals 10-2 through 10-n. After the conference start process is completed, the terminals 10-1 through 10-n that are participating in the conference may start transmission/reception of content data, such as video and audio, to/from each other (steps S1011-1 through S1011-n).

FIG. 19 illustrates an example display screen based on the codec correspondence information that is displayed on the terminal 10-1 in step S1007 of FIG. 18. The display screen of FIG. 19 is based on the codec correspondence information of FIG. 17 and indicates that there are no problems with regard to video transmission (i.e., video data transmitted by the terminal 10-1 can be received and displayed by all the terminals 10 that are to participate in the conference). With regard to video reception, the display screen of FIG. 19 indicates that the terminal 10-1 would be unable to decode and display video data transmitted from "Japan Osaka Office AA Terminal". Similarly, with regard to audio transmission, the display screen of FIG. 19 indicates that two terminals, "Japan Tokyo Office BB Terminal" and "U.S.A. New York Office CC Terminal", would be unable to receive/reproduce audio data transmitted from the terminal 10-1. With regard to audio reception, the display screen of FIG. 19 indicates that there are no problems (i.e., the terminal 10-1 would be able to receive/reproduce audio data transmitted from all the terminals 10 that are to participate in the conference). The terminal 10-1 accepts an approval operation when an "OK" button 501 of the display screen of FIG. 19 is pressed (selected), and the terminal 10-1 cancels the conference start request when a "Cancel" button 502 of the display screen of FIG. 19 is pressed (selected), for example.

In this way, the user of the terminal 10-1 may be notified of communication counterpart terminals that may have problems in transmitting/receiving video/audio data to/from the terminal 10-1. Thus, the user may determine whether the conditions as indicated in the display screen are acceptable and determine whether to proceed by starting the conference under these conditions.

Figure 20:
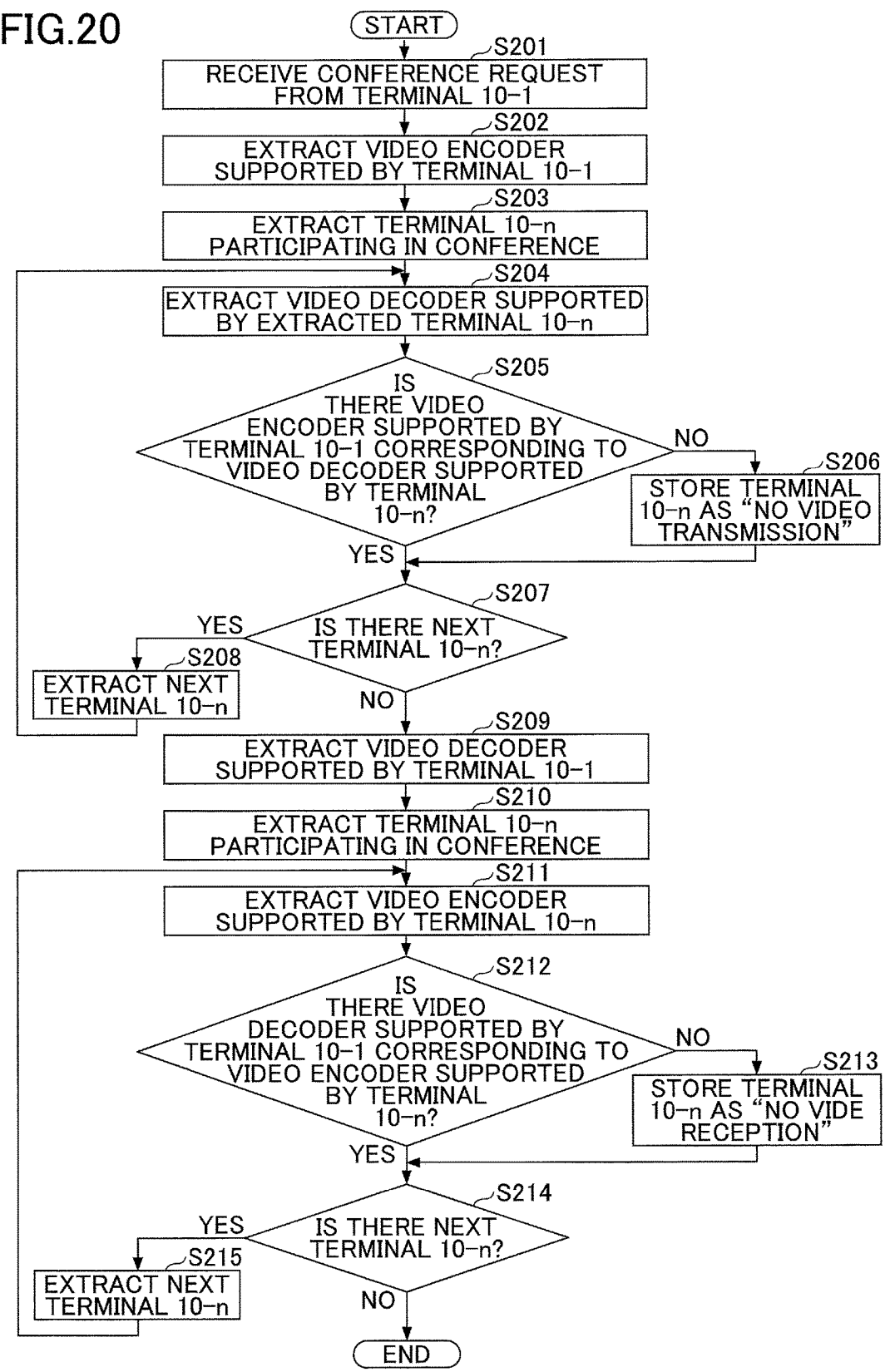
FIG. 20 is a flowchart illustrating an example codec correspondence information generation process.

In the following, the codec correspondence information generation process performed by the determination unit 61 is described with reference to FIG. 20. FIG. 20 is a flowchart illustrating example process operations of the codec correspondence information generation process.

In step S201, the determination unit 61 receives a conference request (communication start request) from the terminal 10-1.

Then, in step S202, the determination unit 61 extracts from the terminal management DB 5003 information on video encoders supported by the terminal 10-1. Note that the number of video encoders supported by the terminal 10-1 may be zero (meaning the terminal 10-1 does not support any video encoder), or one or more.

In step S203, the determination unit 61 refers to the session management DB 5005 and extracts a conference counterpart terminal 10-n that is to participate or is participating in the conference.

In step S204, the determination unit 61 extracts from the terminal management DB 5003 information on video decoders supported by the terminal 10-n. Note that the number of video decoders supported by the terminal 10-n may be zero (meaning the terminal 10-n does not support any video decoder) or one or more.

In step S205, the determination unit 61 determines whether the terminal 10-1 supports one or more video encoders and whether a video encoder that corresponds to a video decoder supported by the terminal 10-n is included among the one or more video encoders supported by the terminal 10-1.

If there is a video encoder supported by the terminal 10-1 that corresponds to a video decoder supported by the terminal 10-n (YES in step S205), the process proceeds to step S207, which is described below.

If there is no video encoder supported by the terminal 10-1 that corresponds to a video decoder supported by the terminal 10-n (NO in step S205), the determination unit 61 stores the terminal 10-n under the field "No Video Transmission" of the codec correspondence information to be generated.

In step S207, the determination unit 61 refers to the session management DB 5005 to determine whether there is a next conference counterpart terminal 10-n that has not yet been extracted.

If there is a next conference counterpart terminal 10-n (YES in step S207), the determination unit 61 extracts the next conference counterpart terminal 10-n that is to participate or is participating in the conference (step S208), and the process proceeds to step S204.

If there is no next conference counterpart terminal 10-n (NO in step S207), the determination unit 61 extracts from the terminal management DB 5003 information on video decoders supported by the terminal 10-1 (step S209). Note that the number of video decoders supported by the terminal 10-1 may be zero (meaning the terminal 10-1 does not support any video decoder) or one or more.

In step S210, the determination unit 61 refers to the session management DB 5005 to extract the conference counterpart terminal 10-n that is to participate or is participating in the conference.

In step S211, the determination unit 61 extracts from the terminal management DB 5003 information on video encoders supported by the terminal 10-n. Note that the number of video encoders supported by the terminal 10-n may be zero (meaning the terminal 10-n does not support any video encoder) or one or more.

In step S212, the determination unit 61 determines whether the terminal 10-1 supports one or more video decoders and whether a video decoder that corresponds to a video encoder supported by the terminal 10-n is included among the one or more video decoders supported by the terminal 10-1.

If there is a video decoder supported by the terminal 10-1 that corresponds to a video encoder supported by the terminal 10-n (YES in step S212), the process proceeds to step S213, which is described below.

If there is no video decoder supported by the terminal 10-1 that corresponds to a video encoder supported by the terminal 10-n (NO in step S212), the determination unit 61 stores the terminal 10-n under the field "No Video Reception" of the codec correspondence information to be generated (step S213).

In step S214, the determination unit 61 refers to the session management DB 5005 to determine whether there is a next conference counterpart terminal 10-n.

If there is a next conference counterpart terminal 10-n (YES in step S214), the determination unit 61 extracts the next conference counterpart terminal 10-n (step S215), and the process proceeds to step S211.

If there is no next conference counterpart terminal 10-n (NO in step S214), the process is ended.

Note that the above-described process for generating codec correspondence information on video encoders/decoders supported by the terminals may similarly be implemented with respect to audio encoders/decoders. In this case, the term "video" may be replaced with the term "audio" in the above description of the process steps of FIG. 20.

In this way, codec correspondence information including a list of terminals 10 that are unable to transmit video data ("No Video Transmission"), receive video data ("No Video Reception"), transmit audio data ("No Audio Transmission") and/or receive audio data ("No Audio Reception") may be generated.

Note that in the above-described example, the codec information registered in the terminal management DB 5003 when the terminal 10-1 logs into the management system 50 is used as the information on codecs (encoders/decoders) supported by the terminal 10-1. However, in other embodiments, the terminal 10-1 may include information on codecs supported by the terminal 10-1 in the conference request transmitted to the management system 50, for example. In this case, the determination unit 61 may execute the processes of acquiring the information on the encoders/decoders supported by the terminal 10-1 in steps S202 and S210 of FIG. 20 by extracting the relevant information from the information included in the conference request received from the terminal 10-1 in step S201, for example.

Figure 21:
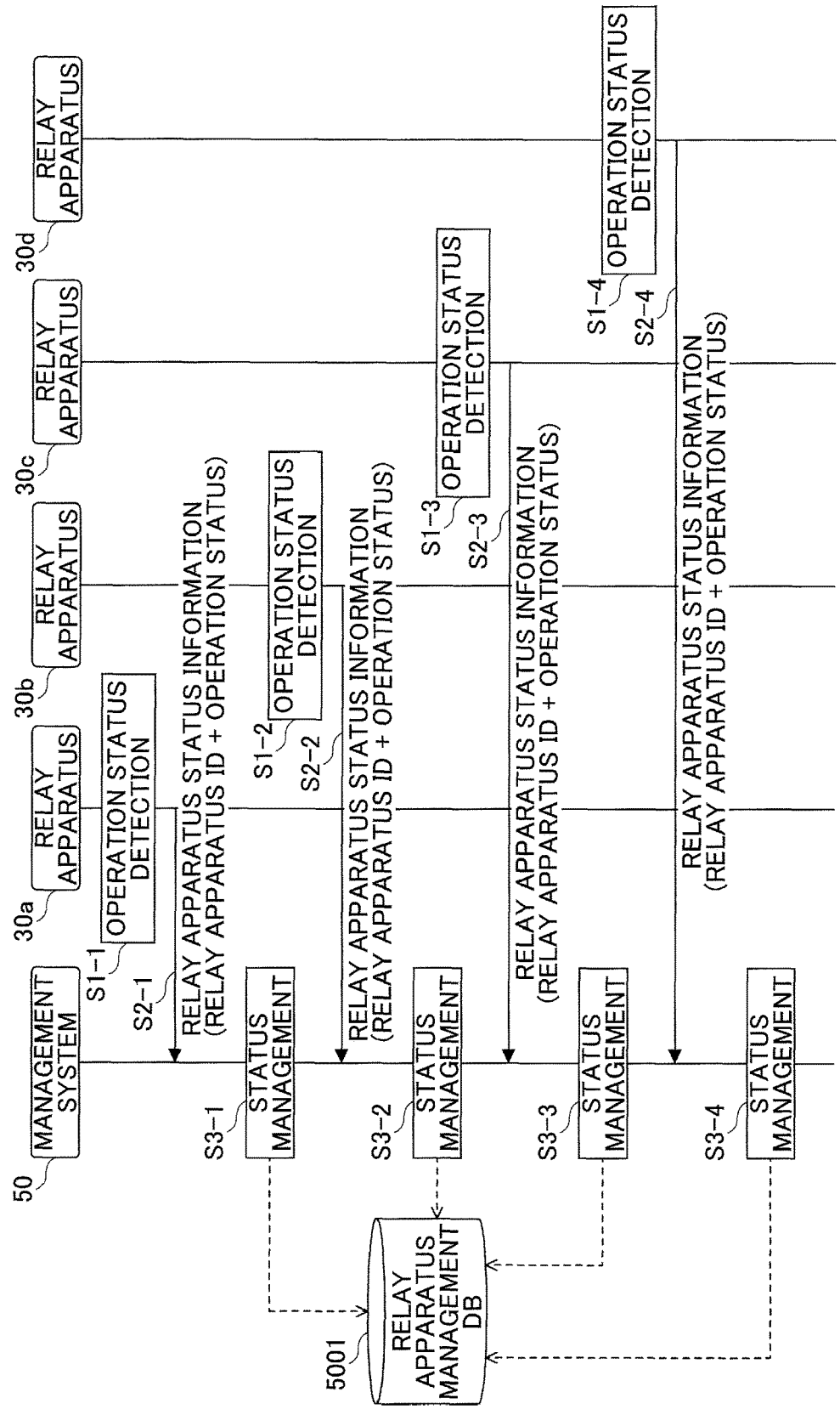
FIG. 21 is a sequence chart illustrating an example process of managing status information indicating an operation status of each relay apparatus.
Figure 22:
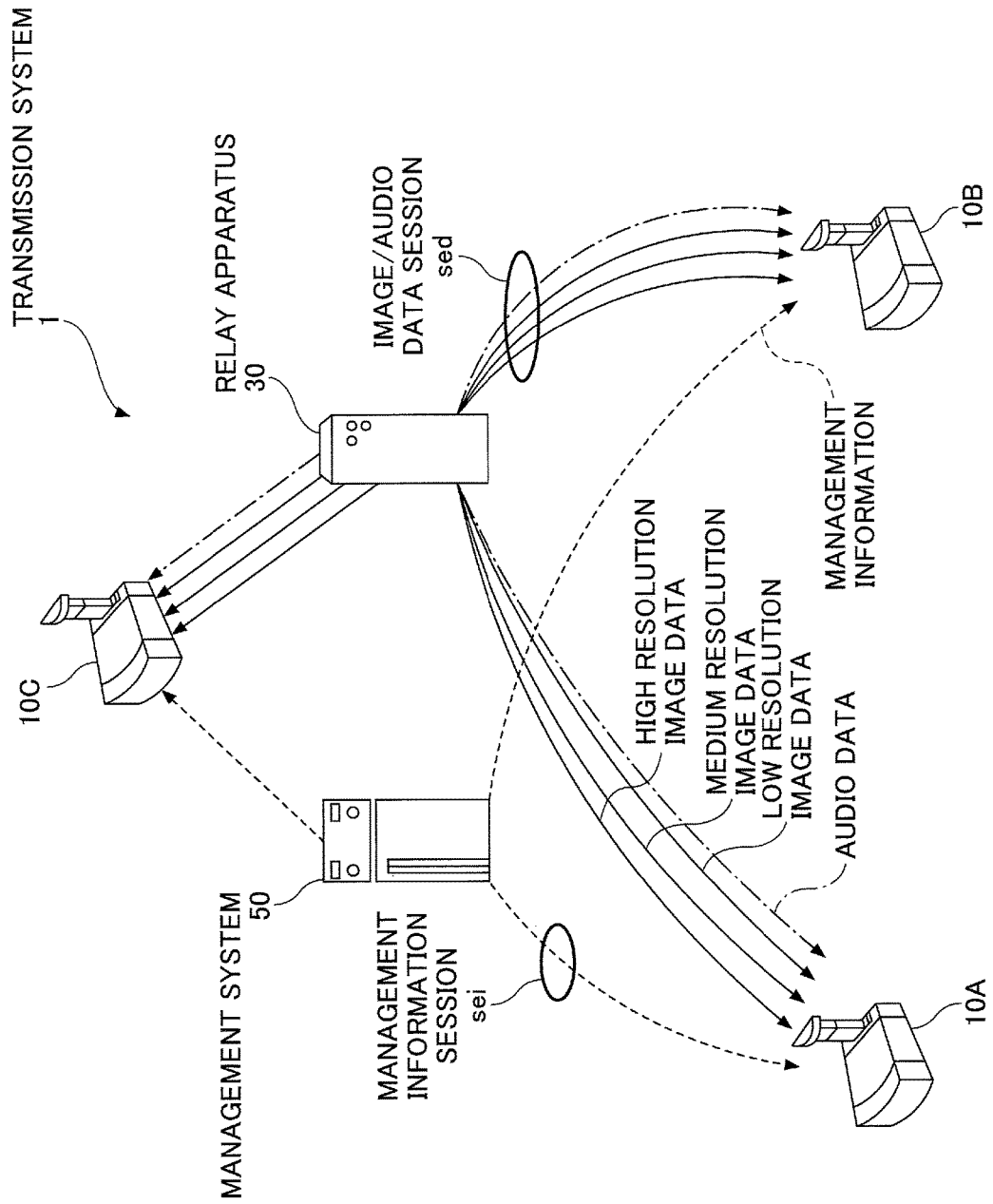
FIG. 22 is a conceptual diagram illustrating transmission/reception of image data, audio data, and various types of management information in the transmission system.
Figure 23:
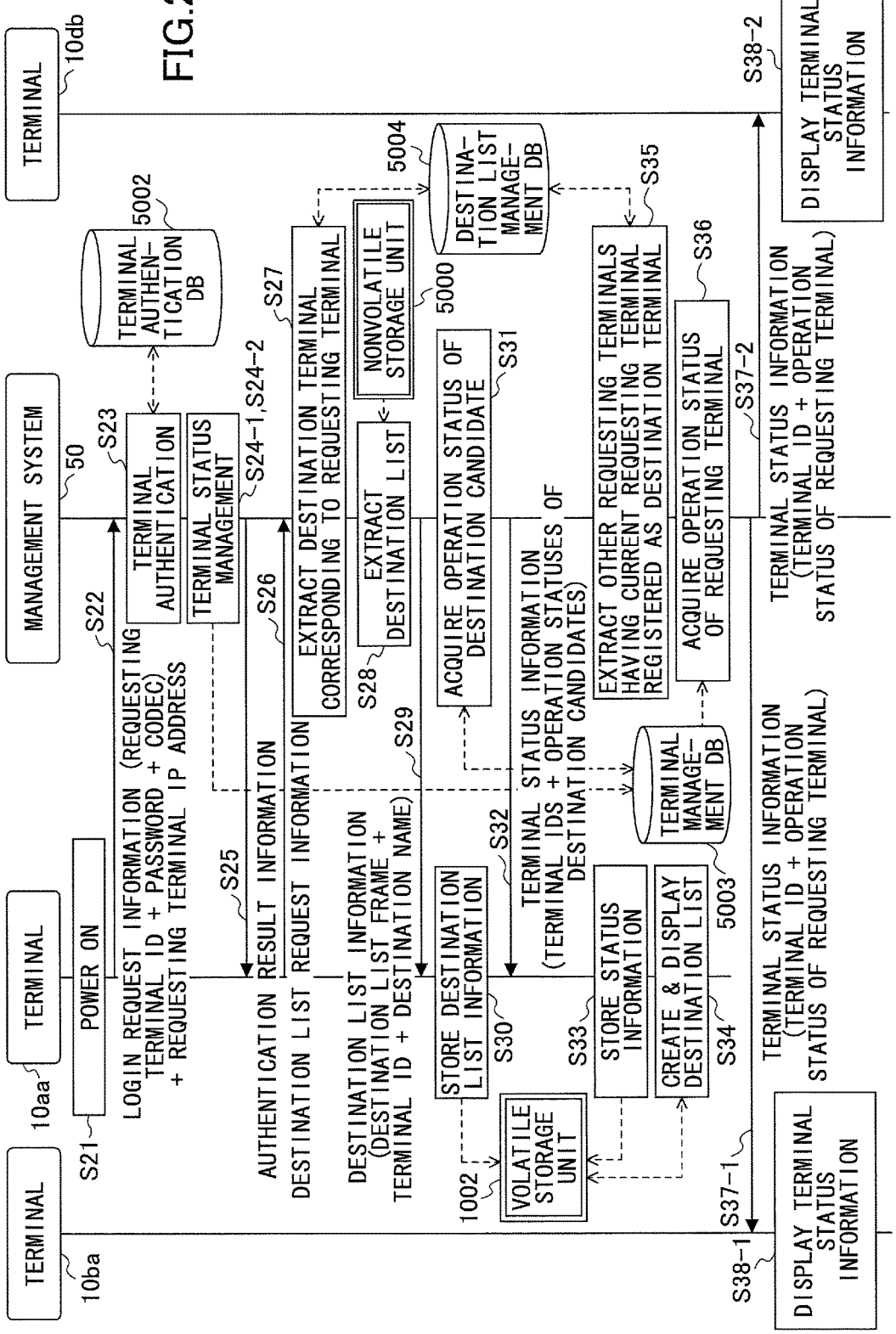
FIG. 23 is a sequence chart illustrating example process operations at a preparation stage before starting a call session between transmission terminals.
Figure 25:
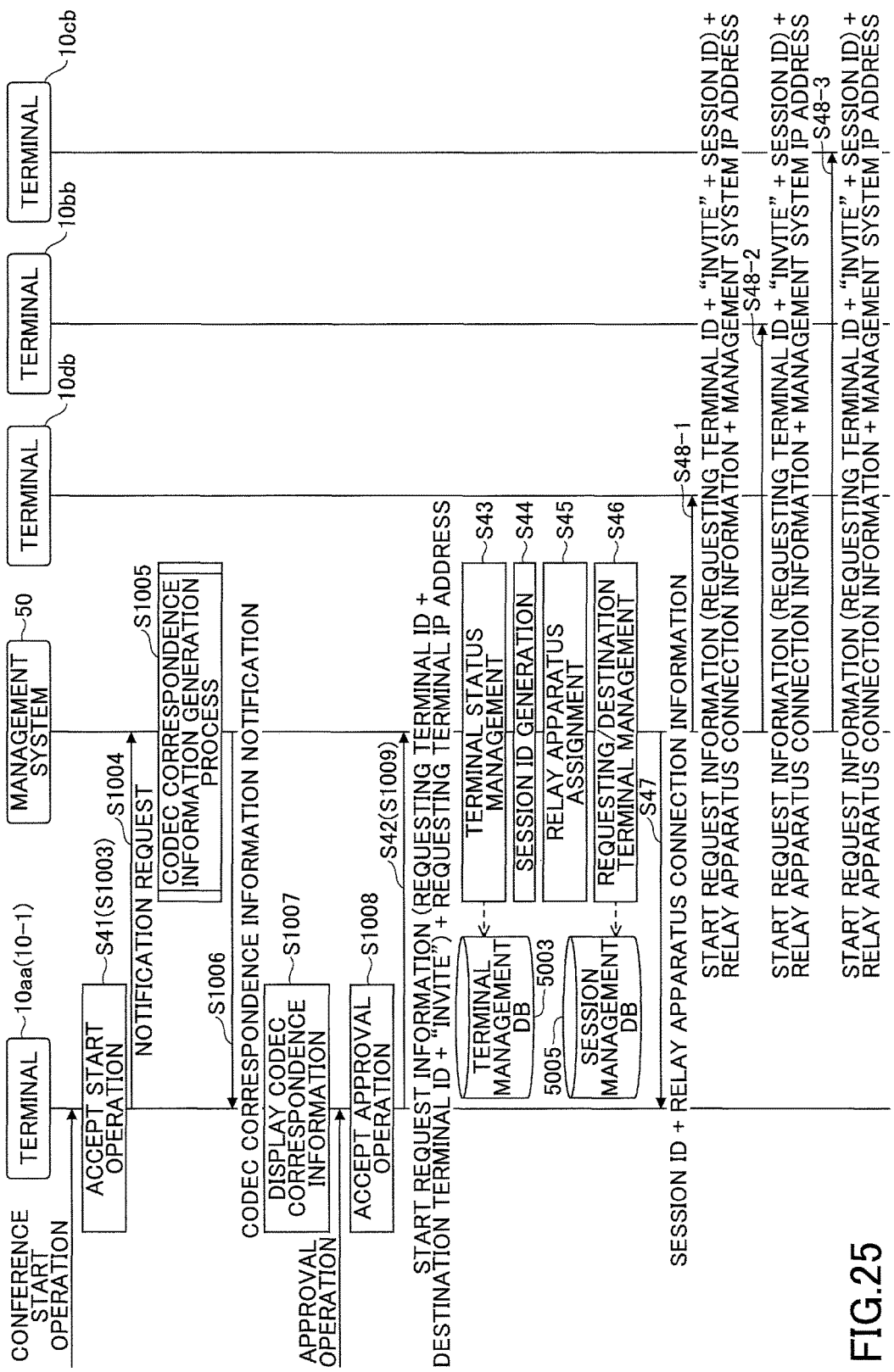
FIG. 25 is a sequence chart illustrating an example process of transmitting a communication start request.
Figure 26:
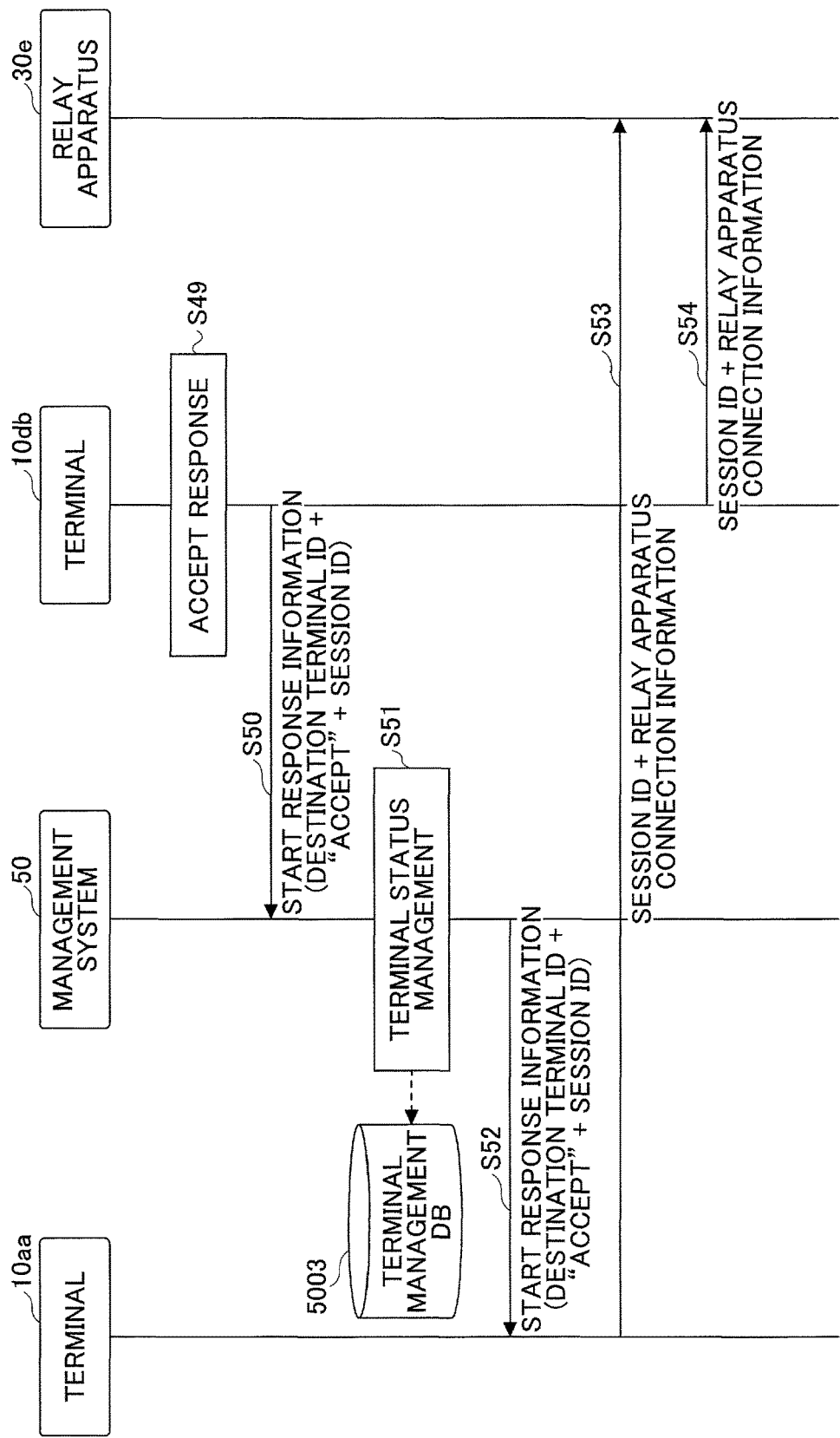
FIG. 26 is a sequence chart illustrating an example process of authorizing the communication start request.
Figure 27:
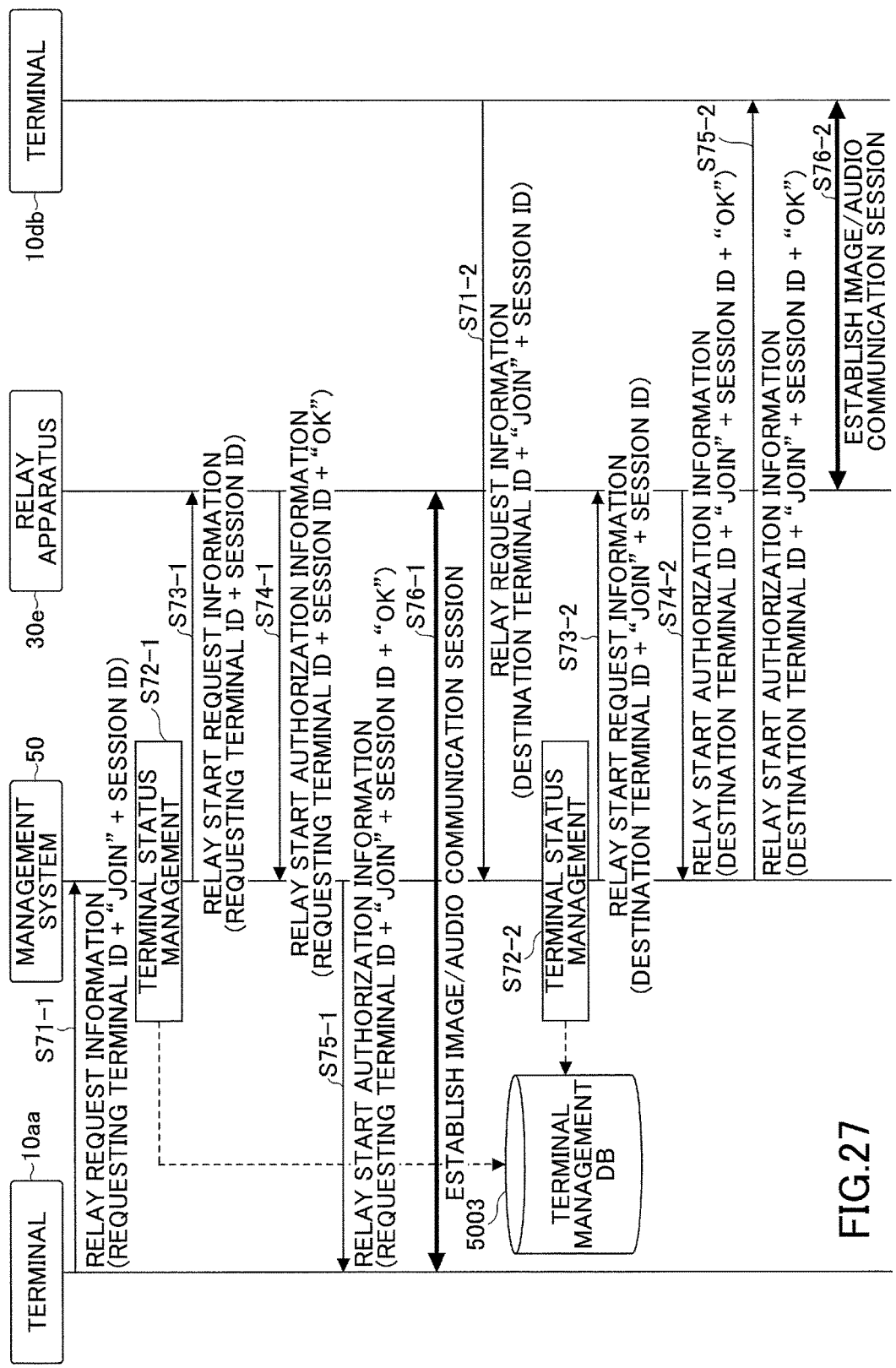
FIG. 27 is a sequence chart illustrating an example process of transmitting a request to relay call data.
Figure 28:
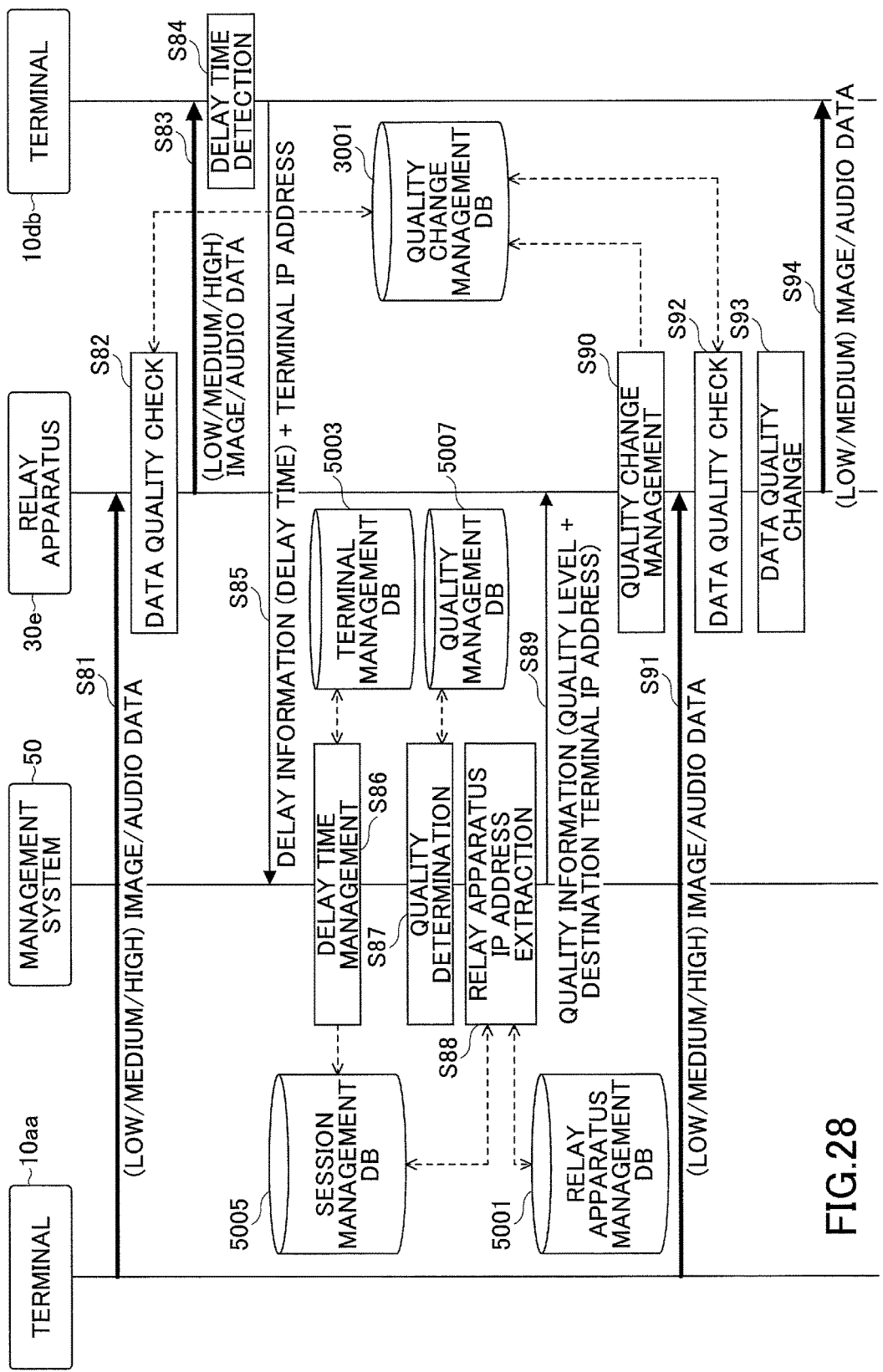
FIG. 28 is a sequence chart illustrating an example process of transmitting/receiving image data and audio data to/from transmission terminals.
Figure 29:
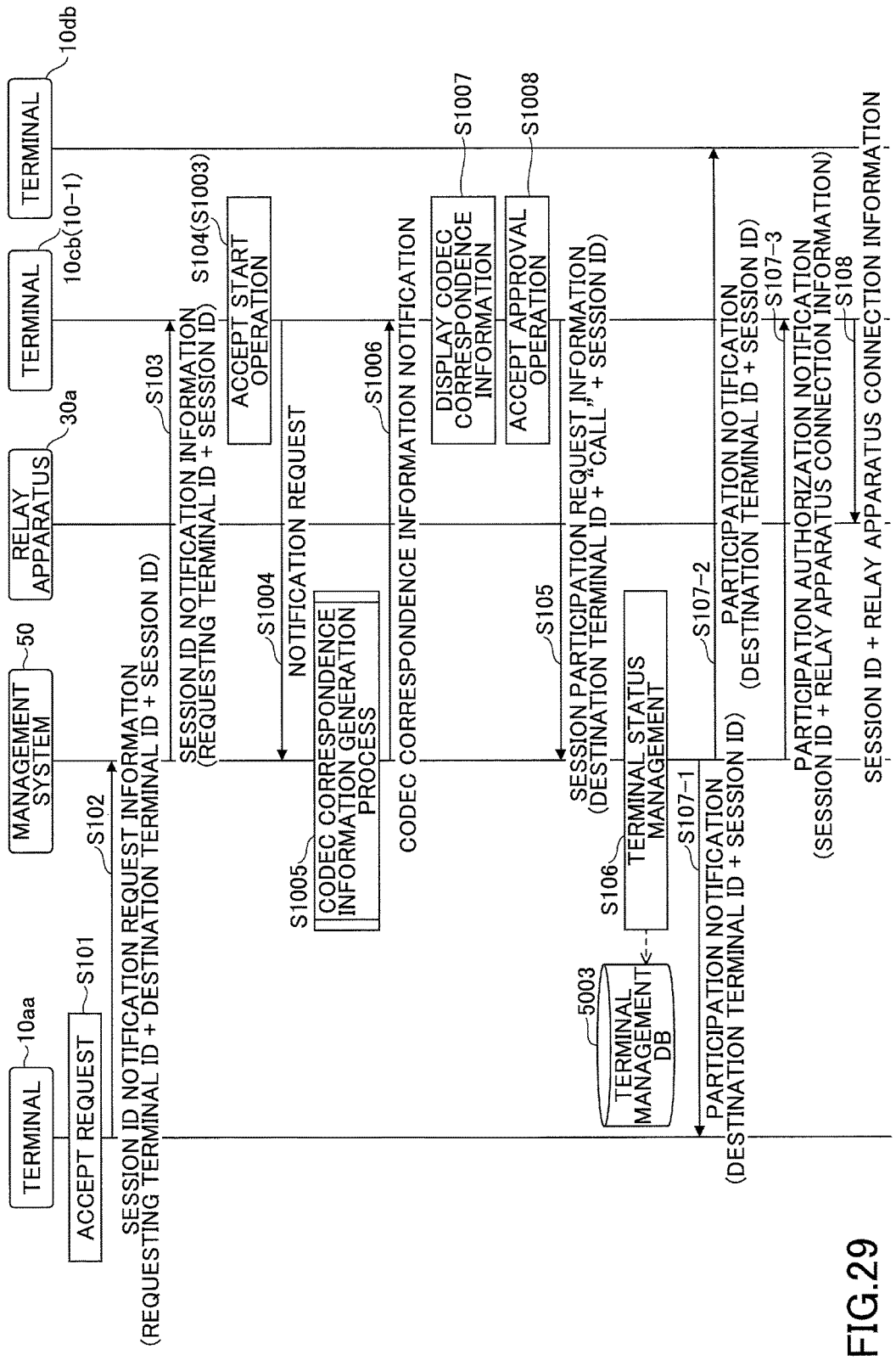
FIG. 29 is a sequence chart illustrating an example process of transmitting a session participation request.
Figure 30:
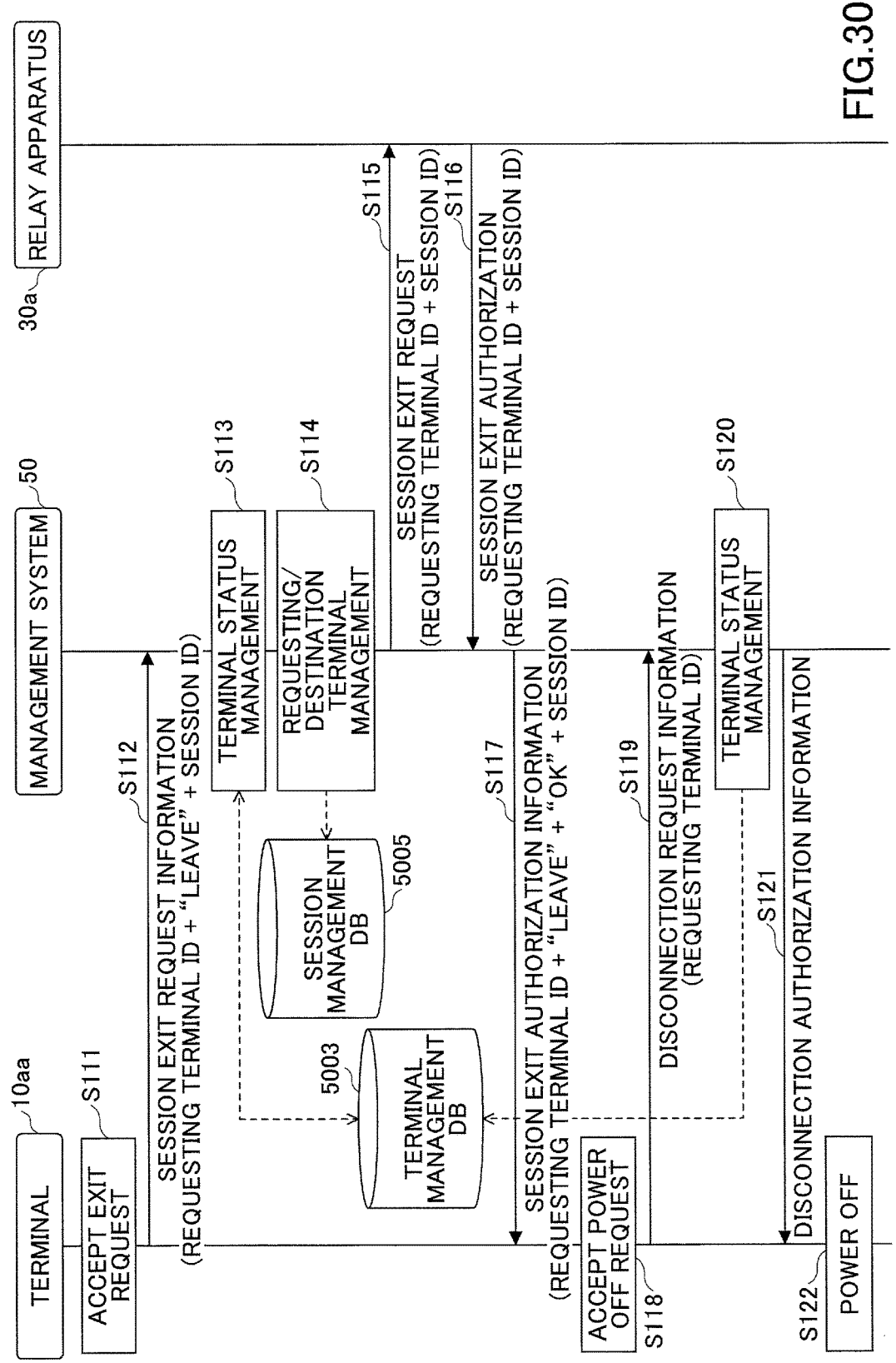
FIG. 30 is a sequence chart illustrating an example process of transmitting a session exit request.
Figure 31:
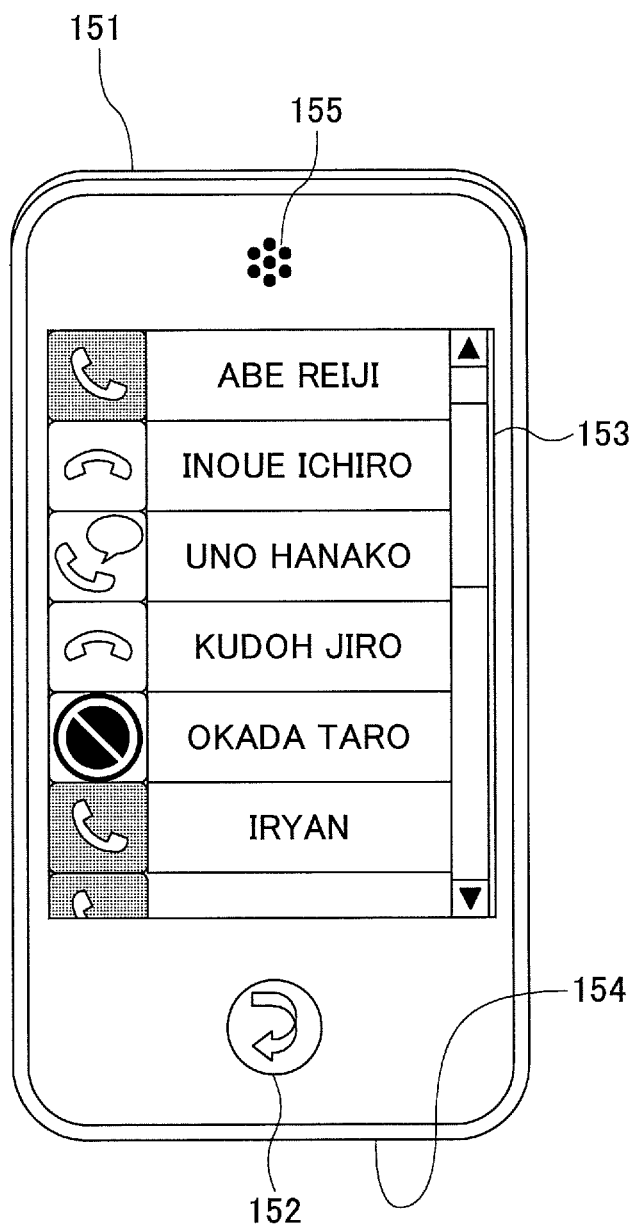
FIG. 31 is a diagram illustrating a destination list according to another embodiment of the present invention.

In the following, example detailed process operations of the transmission system 1 according to the present embodiment are described. FIG. 21 is a sequence chart illustrating an example process of managing status information indicating the operation status of each relay apparatus 30. FIG. 22 is a conceptual diagram illustrating transmission/reception of image data, audio data, and various types of management information in the transmission system 1. FIG. 23 is a sequence chart illustrating example process operations at a preparation stage before starting a call between terminals. FIG. 24 is a diagram illustrating an example destination list according to one embodiment. FIG. 25 is a sequence chart illustrating an example process of transmitting a communication start request. FIG. 26 is a sequence chart illustrating an example process of authorizing the communication start request. FIG. 27 is a sequence chart illustrating an example process of requesting to start relaying call data. FIG. 28 is a sequence chart illustrating an example process of transmitting/receiving image data and audio data to/from terminals. FIG. 29 is a sequence chart illustrating an example process of requesting to participate in a call data session. FIG. 30 is a sequence chart illustrating an example process of requesting to leave the call data session. FIG. 31 is a diagram illustrating another example destination list according to another embodiment of the present invention. FIG. 32 is an external view of the terminal according to the present embodiment.

First, referring to FIG. 21, the process of managing status information indicating the operation status of each relay apparatus 30 transmitted to the management system 50 from each relay apparatus 30 is described. In steps S1-1 through S1-4, the status detection unit 32 (see FIG. 4) of each relay apparatus 30a-30d periodically detects the operation status of its own apparatus. In order to enable the management system 50 to manage the operation status of the relay apparatuses 30a-30d in real time, in steps S2-1 through S2-4, the transmission/reception unit 31 of each relay apparatus 30a-30d periodically transmits status information indicating the operation status of its own apparatus to the management system 50 via the communication network 2. The status information transmitted from each relay apparatuses 30a-30d may include the relay apparatus ID of the corresponding relay apparatus 30 and the operation status detected by the status detection unit 32 of the relay apparatus 30 identified by the relay apparatus ID. Note that in the present example, it is assumed that the relay apparatuses 30a, 30b, and 30d are operating normally such that their operation statuses are indicated as "Online", whereas the relay apparatus 30c is operating but is indicated as "Offline" due to some problem in the program for executing relay operations of the relay apparatus 30c.

Then, in steps S3-1 through S3-4, the transmission/reception unit 51 of the management system 50 receives the status information transmitted from each relay apparatus 30, and the management system 50 stores and manages the status information of each relay apparatus 30 in association with the relay apparatus ID of each relay apparatus 30 in the relay apparatus management table (see FIG. 7) of the nonvolatile storage unit 5000 via the read/write process unit 59. In this way, the operation status of each relay apparatus 30 indicated as "Online", "Offline", or "Out of Service" may be stored and managed in association with each relay apparatus ID in the relay apparatus management table as illustrated in FIG. 7, for example. Also, the reception date/time of the status information received by the management system 50 is stored and managed in association with each relay apparatus ID in the relay apparatus management table. Note that in a case where status information is not transmitted from a given relay apparatus 30, the "operation status" field and the "reception date/time" field of a record for the given relay apparatus 30 in the relay apparatus management table of FIG. 7 may be left blank, or the operation status and the reception date/time of status information previously received from the given relay apparatus 30 may be indicated in the relay apparatus management table, for example.

Next, referring to FIG. 22, the transmission/reception of image data, audio data, and various types of management information in the transmission system 1 is described. As illustrated in FIG. 22, in the transmission system 1 of the present embodiment, a management information session sei is established between terminal 10A, terminal 10B, and terminal 10C for enabling the transmission/reception of various types of management information to/from these terminals via the management system 50. Also, four sessions are established between the terminal 10A, the terminal 10B, and the terminal 10C for enabling the transmission/reception of high-resolution image data, medium-resolution image data, low-resolution image data, and audio date via the relay apparatus 30. Note that in FIG. 22, the above four sessions are collectively represented as "image/audio data session sed".

Next, referring to FIG. 23, processes operations performed at a preparation stage before the terminal 10aa starts a call, including the processes of transmitting/receiving and managing codec information in steps S1001 and S1002 of FIG. 18 and other processes of transmitting/receiving various types of management information are described. Note that FIG. 23 illustrates an example where all the various types of management information are transmitted/received using the management information session sei.

When the user of the terminal 10aa switches on the power switch 109 of FIG. 2, the operation input accepting unit 12 of FIG. 4 accepts the power-on operation and turns on the power of the terminal 10aa (step S21). In response to the acceptance of the power-on operation, the login request unit 13 automatically transmits a login request including login request information from the transmission/reception unit 11 to the management system 50 via the communication network 2 (step S22). The login request information may include the terminal ID identifying the terminal 10aa as the requesting terminal, a password, and information on codecs (encoders/decoders) supported by the terminal 10aa. The terminal ID, password, and information on codecs supported by the terminal 10aa may be read from the nonvolatile storage unit 1000 via the read/write process unit 19 and transmitted to the transmission/reception unit 11, for example. Note that when the login request information is transmitted from the terminal 10aa to the management system 50, the management system 50 receiving the login request information may be able to recognize the IP address of the terminal 10aa transmitting the login request information.

Then, the terminal authentication unit 52 of the management system 50 performs terminal authentication by searching the terminal authentication management table (see FIG. 8) of the nonvolatile storage unit 5000 using the terminal ID and the password included in the login request information received via the transmission/reception unit 51 as search keys and determining whether the same set of terminal ID and password is managed in the terminal authentication management DB 5002 (step S23).

If it is determined by the terminal authentication unit 52 that the same set of terminal ID and password is managed in the terminal authentication DB 5002 such that the terminal 10aa making the login request has legitimate authority to access the management system 50, the status management unit 53 stores the reception date/time of the login request information, the IP address of the terminal 10aa, and the information on the codecs (encoders/decoders) supported by the terminal 10aa in association with the terminal ID and the destination name of the terminal 10aa in a corresponding record of the terminal management table (see FIG. 9) (step S24-1). As a result, in the terminal management table of FIG. 9, the reception date/time "2009.11.10.13:40", the terminal IP address "1.2.1.3", encoders "H.264/Speex", decoders "H.264/Speex" may be managed in association with the terminal ID "01aa". Note that in some embodiments, the management system 50 may be configured to receive from the terminal 10aa the information on the codecs supported by the terminal 10aa after the terminal 10aa has successfully logged in, for example.

Then, the status management unit 53 sets up the operation status of the terminal 10aa as "Online" and the communication status of the terminal 10aa as "None" and stores the corresponding operation status and communication status of the terminal 10aa in association with the terminal ID and the destination name of the terminal 10aa in the corresponding record of the terminal management table (see FIG. 9) (step S24-2). As a result, in the terminal management table of FIG. 9, the operation status "Online" and the communication status "None" may be stored and managed in association with the terminal ID "01aa".

Then, the transmission/reception unit 51 of the management system 50 transmits authentication result information indicating the result of the terminal authentication performed by the terminal authentication unit 52 to the terminal 10aa corresponding to the requesting terminal that has made the login request via the communication network (step S25). In the following descriptions, it is assumed that the terminal authentication unit 52 has determined that the terminal 10aa has legitimate authority to access the management system 50.

When the terminal 10aa receives the authentication result information indicating that it has been determined to have legitimate authority, the transmission/reception unit 11 transmits destination list request information requesting for a destination list to the management system 50 via the communication network 2 (step S26). In this way, the transmission/reception unit 51 of the management system 50 receives the destination list request information.

Then, the terminal extraction unit 54 extracts the terminal IDs of destination terminal candidates by searching the destination list management table (see FIG. 10) using the terminal ID "01aa" of the terminal 10aa corresponding to the requesting terminal that has made the login request as a search key and retrieving the terminal IDs of terminals that are registered as destination terminal candidates that can establish a call with the terminal 10aa corresponding to the requesting terminal from the destination list management table (step S27). Further, the terminal extraction unit 54 searches the terminal management table (see FIG. 9) using the extracted terminal IDs as search keys to acquire the destination names corresponding to the terminal IDs. In the present example, the terminal IDs ("01ab", "01ba", "01db", . . . ) of destination terminal candidates (10ab, 10ba, 10db, . . . ) for the requesting terminal 10aa with the terminal ID "01aa" and the destination names ("Japan Tokyo Office AB Terminal", . . . , "Japan Osaka Office BA Terminal", . . . "U.S.A. Washington Office DB Terminal", . . . ) corresponding to the above terminal IDs are extracted.

Then, the transmission/reception unit 51 of the management system 50 acquires destination list frame data (data representing a part of the destination list frame 1100-1 illustrated in FIG. 24) from the nonvolatile storage unit 5000 via the read/write process unit 59 (step S28), and transmits "destination list information (destination list frame+terminal ID+destination name)" including the acquired destination list frame and the terminal IDs and destination names extracted by the terminal extraction unit 54 to the terminal 10aa corresponding to the requesting terminal (step S29). In turn, the transmission/reception unit 11 of the terminal 10aa corresponding to the requesting terminal receives the destination list information, and the read/write unit 19 stores the destination list information in the volatile storage unit 1100 (step S30).

Also, the terminal status acquisition unit 55 of the management system 50 acquires the operation statuses of the terminals corresponding to the destination terminal candidates (10ab, 10ba, 10db, . . . ) by searching the terminal management table (see FIG. 9) using the terminal IDs ("01ab", "01ba", "01db", . . . ) of the destination terminal candidates extracted by the terminal extraction unit 54 as search keys and reading the corresponding operation statuses associated with the extracted terminal IDs (step S31).

Then, the transmission/reception unit 51 transmits "terminal status information" including the terminal ID "01ab" that was used as a search key in step S31 and the corresponding operation status "Offline" of the destination terminal candidate (terminal 10ab) to the requesting terminal (terminal 10aa) via the communication network 2 (step S32). Similarly, as part of the process of step S32, the transmission/reception unit 51 transmits "terminal status information" including the terminal ID "01ba" and the corresponding operation state "Online (Calling)" of the destination terminal (terminal 10ba) to the requesting terminal (terminal 10aa). Note that the transmission of such "terminal status information" to the requesting terminal (terminal 10aa) is similarly performed with respect to each of the other destination terminal candidates.

Then, the read/write process unit 19 of the requesting terminal (terminal 10aa) sequentially stores the terminal status information received from the management system 50 in the volatile storage unit 1100 (step S33). In this way, by receiving the status information of each terminal, the requesting terminal (terminal 10*aa*) may be able to acquire the current operation status of each destination terminal candidate (e.g., terminal 10*ab*) that can establish a call with the requesting terminal (terminal 10*aa*).

Then, the destination list generation unit 20 of the requesting terminal (terminal 10*aa*) generates a destination list indicating the operation statuses of the terminals 10 corresponding to destination terminal candidates based on the destination list information and the terminal status information stored in the volatile storage unit 1100, and the display control unit 16 controls the display timing for displaying the display list on the display 120 of FIG. 2 (step S34).

In this way, the display list as illustrated in FIG. 24 displaying destination names of the destination terminal candidates (1100-2) and icons indicating their operation statuses (1100-3*a*, 1100-3*b*. 1100-3*c*, 1100-3*d*) within the destination list frame 1100-1 may be displayed on the display 120 of the terminal 10*aa*.

Meanwhile, referring back to FIG. 23, the terminal extraction unit 54 of the management system 50 searches the destination list management table (see FIG. 10) using the terminal ID "01aa" of the requesting terminal (terminal 10*aa*) that has made the login request as a search key and extracts the terminals ID of other requesting terminals that have the terminal ID "01aa" of the requesting terminal (terminal 10*aa*) registered as a destination terminal candidate (step S35). In the destination list management table of FIG. 10, the terminals ID of other requesting terminals that would be extracted in step S35 include the terminal IDs "01ab", "01ba", and "01db".

Then, the terminal status acquisition unit 55 of the management system 50 searches the terminal management table (see FIG. 9) using the terminal ID "01aa" of the requesting terminal (terminal 10*aa*) that has made the login request as a search key to acquire the operation status of the requesting terminal (terminal 10*aa*) that has made the login request (step S36).

Note that in the terminal management table of FIG. 9, among the terminals 10*ab*, 10*ba*, and 10*db* identified by the terminal IDs "01ab", "01ba", and "01db" extracted in step S35, the operation statuses of the terminals 10*ba* and 10*db* are indicated as "Online". Accordingly, in steps S37-1 and S37-2, the transmission/reception unit 51 transmits "terminal status information" including the terminal ID "01aa" of the requesting terminal 10*aa* and the operation status "Online" of the requesting terminal 10*aa* acquired in step S36 to the terminals 10*ba* and 10*db*. Note that in transmitting the terminal status information to the terminals 10*ba* and 10*db*, the transmission/reception unit 51 refers to the terminal management table of FIG. 9 to acquire the IP addresses of the terminals 10*ba* and 10*db* based on their terminal IDs "01ba" and "01db". In this way, terminal status information including the terminal ID "01aa" and the operation status "Online" of the requesting terminal 10*aa* that has made the login request may be conveyed to other terminals 10*ba* and 10*db* that are able to establish a call with the requesting terminal 10*aa*. In turn, the terminals 10*ba* and 10*db* may display the received terminal status information (steps S38-1 and S38-2).

Note that the above-described processes may be performed at terminals 10 other than the above-described terminal 10*aa* as well. That is, when the user of a terminal 10 other than the terminal 10*aa* switches on the power switch 109 (FIG. 3) of the terminal 10 and the operation input accepting unit 12 (FIG. 4) accepts the power-on operation in a manner similar to step S21, processes similar to the above-described processes of steps S22 through S38-1 and S38-2 of FIG. 23 may be executed with the terminal 10 as the requesting terminal. Because the processes performed with respect to the other terminals 10 are substantially identical to the processes of FIG. 23, descriptions thereof are hereby omitted.

Next, referring to FIG. 25, the processes of steps S1003 through S1009 in which a terminal makes a request to newly start a conference with one or more other terminals are described. Note that in the example illustrated in FIG. 25, the terminal 10*aa* corresponds to the terminal 10-1 of FIG. 18.

Note that in the example of FIG. 25, it is assumed that the session sei is used to transmit/receive all the various types of management information to/from the terminals 10 and the management system 50. Also, in the present example, according to the terminal status information of each of the destination terminal candidates received in step S32 of FIG. 23, the requesting terminal (terminal 10*aa*) is able to establish a call with at least one of the terminals 10*bb*, 10*cb*, and 10*db* with the operation status "Online" and the communication status "None". In the following descriptions, an example case is described in which the user of the terminal 10*aa* has selected the terminals 10*bb*, 10*cb*, and 10*db* as destination terminals with which the requesting terminal 10*aa* is to start a call.

When the user of the requesting terminal 10*aa* operates the operation button 108 (FIG. 2) to select the terminals 10*bb*, 10*cb*, and 10*db* as destination terminals, the operation input accepting unit 12 (FIG. 4) of the requesting terminal 10*aa* accepts the operation as a request for starting a call (conference) with the terminals 10*bb*, 10*cb* and 10*db* (step S41). Note that step S41 is an example process step corresponding to step S1003 of FIG. 18 for designating one or more destination terminals to start a new conference.

Then, the above-described processes of step S1004 through S1008 of FIG. 18 are performed. When the requesting terminal 10*aa* accepts an approval operation in step S1008, the transmission/reception unit 11 of the terminal 10*aa* transmits "start request information," which includes the terminal ID "01aa" of the requesting terminal 10*aa*, the terminal IDs "01bb", "01cb", and "01db" of the destination terminals 10*bb*, 10*cb*, and 10*db*, and change request information "Invite" indicating a request to start communication, to the management system 50 (step S42). Note that the process of step S42 is an example process of step S1009 of FIG. 18. In this way, the transmission/reception unit 51 of the management system 50 may receive the start request information and recognize the IP address "1.2.1.3" of the requesting terminal 10*aa* corresponding to the sender of the start request information.

Then, in step S43, based on the terminal ID "01aa" of the requesting terminal 10*aa*, the terminal ID "01bb" of the destination terminal 10*bb*, terminal ID "01cb' of the destination terminal 10*cb*, and the terminal ID "01db" of the destination terminal 10*db* that are included in the start request information, the status management unit 53 changes the information indicated in the "communication status" field of each of the records of the terminal management table (see FIG. 9) that include the terminal IDs "01bb", "01cb", and "01db".

Then, in step S44, the relay apparatus selection unit 56 generates a session ID "se1" for identifying a session (image/audio data session sed) to be used for establishing a call with each of the destination terminals specified in the start request information from the requesting terminal 10*aa*. Once the session ID is generated, the session management unit 57 stores the generated session ID "se1" and the number of destination terminals "3" in the volatile storage unit 5100. Note that the number of destination terminals is used in a case where change request information "Reject" indicating a rejection of the communication start request is subsequently received from at least one of the destination terminals. In such case, the number of destination terminals is used to determine whether the change request information "Reject" has been received from all of the destination terminals.

Then, in step S45, the relay apparatus selection unit 56 of the management system 50 selects the relay apparatus 30 that is to be used to relay call data to/from the requesting terminal 10*aa* and the destination terminals 10*bb*, 10*cb*, and 10*db* based on the relay apparatus management DB 500 and the relay apparatus selection management DB 5008. In this step, first, based on the terminal ID "01aa" of the requesting terminal 10*aa*, the terminal ID "01bb" of the destination terminal 10*bb*, terminal ID "01cb" of the destination terminal 10*cb*, and the terminal ID "01db" of the destination terminal 10*db* that are included in the start request information transmitted from the requesting terminal 10*aa*, the relay apparatus selection unit 56 refers to the relay apparatus selection management table (see FIG. 13) to extract the relay apparatus IDs "111a", "111b", and "111c" respectively associated with the terminal IDs of the terminals 10*aa*, 10*bb*, and 10*cb*.

If the relay apparatus IDs extracted above are the same, the relay apparatus selection unit 56 refers to the relay apparatus management table (see FIG. 7) to check the operation status of the relay apparatus 30 identified by the extracted relay apparatus ID. If the operation status of the relay apparatus 30 identified by the extracted relay apparatus ID is "Online", this relay apparatus 30 is selected to be used for relaying call data. If the extracted relay apparatus IDs are not the same, or if the operation status of the extracted relay apparatus ID is "offline", the relay apparatus 30*e* with the relay apparatus ID "111e" is selected as the relay apparatus 30 to be used for relaying call data. In the following, an example case where the relay apparatus 30*e* is selected will be described.

After the relay apparatus selection process is completed, the session management unit 57 stores and manages relevant information the record including the session ID "set" of the session management table (see FIG. 11) of the nonvolatile memory section 5000. Specifically, the session management unit 57 stores and manages the terminal ID "01aa" of the requesting terminal 10*aa*, the terminal ID "01bb" of the destination terminal 10*bb*, terminal ID "01cb' of the destination terminal 10*cb*, the terminal ID "01db" of the destination terminal 10*db*, and the relay apparatus ID "111e" of the selected relay apparatus 30*e* in the corresponding fields "requesting terminal ID", "destination terminal ID" and "relay apparatus ID" of the record including the session ID "se1" of the session management table (step S46).

Then, in step S47, the transmission/reception unit 51 transmits the generated session ID "se1" and relay apparatus connection information to be used for establishing connection with the relay apparatus 30*e* selected by the relay apparatus selection unit 56 to the requesting terminal 10*aa* via the communication network 2. The relay apparatus connection information may include the IP address "1.1.1.3", authentication information, and a port number of the relay apparatus 30*e*, for example. In this way, the terminal 10*aa* may be notified of the relay apparatus connection information to be used for establishing connection with the relay apparatus 30*e* that is to be used for relaying call data in the session with the session ID "se1".

Then, in steps S48-1, S48-2, and S48-3, the transmission/reception unit 51 transmits the start request information including the terminal ID "01aa" of the requesting terminal 10*aa*, the change request information "Invite" indicating a request to start communication with the destination terminals; the session ID "se1" and the above-described relay apparatus connection information to be used for establishing connection with the relay apparatus 30*e*; and the IP address of the management system 50 to all of the destination terminals 10*bb*, 10*cb*, 10*db*. Thus, the transmission/reception units 51 of the destination terminals 10*bb*, 10*cb*, and 10*db* may be notified of the start request information, the relay apparatus connection information to be used to establish connection with the relay apparatus 30*e* relaying call data, the IP address "1.1.1.2" of the management system 50.

In the following, referring to FIG. 26, an example process will be described in which the destination terminal 10*db* that has received the start request information from the requesting terminal 10*aa* accepts an operation of the operation button 108 (FIG. 2) by the user corresponding to a response indicating authorization to start communication with the requesting terminal 10*aa*.

In step S49, the operation button 108 (FIG. 2) of the destination terminal 10*db* is pressed (operated) by the user and the operation input accepting unit 12 (FIG. 4) accepts the operation as a response indicating authorization to start communication with the requesting terminal 10*aa*. Then, in step S50, the transmission/reception unit 11 of the destination terminal 10*db* transmits to the management system 50 start response information including the terminal ID "01db" of the destination terminal 10*db*, the terminal ID "01aa" of the requesting terminal 10*aa*, change request information "Accept" indicating authorization to start communication, and the session ID "set".

Then, in step S51, when the transmission/reception unit 51 of the management system 50 receives the start response information, the status management unit 53 uses the terminal ID "01aa" of the requesting terminal 10*aa* and the terminal ID "01db" of the destination terminal 10*db* included in the start response information as search keys and change the information indicated in the "communication status" field of the records including the terminal ID "01aa" and the terminal ID "01db" in the terminal management table (see FIG. 9).

Then, in step S52, the transmission/reception unit 51 transmits to the requesting terminal 10*aa* the start response information including the terminal ID "01db" of the destination terminal 10*db*, the change request information "Accept" indicating acceptance of the request to start communication with the destination terminal, and the session ID "se1". Upon receiving the start response information, the transmission/reception unit 11 of the requesting terminal 10*aa* transmits the session ID "se1" and the relay apparatus connection information acquired in step S47 to the relay apparatus 30*e* and establishes connection with the relay apparatus 30*e* (step S53). Meanwhile, the transmission/reception unit 11 of the destination terminal 10*db* transmits the session ID "se1" and the relay apparatus connection information acquired in step S48-1 to the relay apparatus 30*e* and establishes connection with the relay apparatus 30*e* (step S54).

Note that the destination terminals 10*bb* and 10*cb* may similarly accept a response indicating authorization to start communication with the requesting terminal 10*aa*, and in such case, a process similar to the above-described process for starting communication between the requesting terminal 10*aa* and the destination terminal 10*db* may be performed with respect to the destination terminals 10*bb* and 10*cb*.

In the following, referring to FIG. 27, an example process is described in which the relay apparatus 30*e* starts relaying call data to be exchanged between the requesting terminal 10*aa* and the destination terminal 10*db*. Note that in the example of FIG. 27, it is assumed that the management information session sei is used to transmit/receive all the various types of management information to/from the terminals and the management system 50.

After the requesting terminal 10*aa* establishes connection with the relay apparatus 30*e* in step S53, the transmission/reception unit 11 of the requesting terminal 10*aa* transmits relay request information to the management system 50 at a predetermined timing (step S71-1). The relay request information includes the terminal ID "01aa" of the requesting terminal 10*aa*, the session ID "set", and change request information "Join" indicating a request to start relaying call data.

When the transmission/reception unit 51 of the management system 50 receives the relay request information, the status management unit 53 uses the terminal ID "01aa" of the requesting terminal 10*aa* included in the relay request information to change information indicated in the "communication status" field of the record including the terminal ID "01aa" in the terminal management table (see FIG. 9) (step S72-1).

Then, in step S73-1, the management system 50 transmits relay start request information including the terminal ID "01aa" of the requesting terminal 10*aa* and the session ID "se1" to the relay apparatus 30*e*. Upon receiving the relay start request information, the relay apparatus 30*e* transmits relay start authorization information including notification information "OK" indicating authorization of the relay start request to the management system 50 (step S74-1). Upon receiving the relay start authorization information, the transmission/reception unit 51 of the management system 50 transmits the relay start authorization information to the requesting terminal 10*aa* (step S75-1). In this way, the image/audio data session sed for exchanging call data between the requesting terminal 10*aa* and the relay apparatus 30*a* is established (step S76-1).

Meanwhile, after the destination terminal 10*db* establishes connection with the relay apparatus 30*e* in step S54, the transmission/reception unit 11 of the destination terminal 10*db* transmits relay request information at a predetermined timing to the management system 50 (step S71-2). The relay request information includes the terminal ID "01db" of the destination terminal 10*db*, the session ID "set", and change request information "Join" indicating a request to start relaying call data.

Then, in steps S72-2 through S75-2, processes similar to the above-described steps S72-1 through S75-1 are executed by the management system 50 and the relay apparatus 30*e*, and in this way, the image/audio data session sed for exchanging call data between the destination terminal 10*db* and the relay apparatus 30*e* is established (steps S72-2, S73-2, S74-2, S75-2, and S76-2). When the image/audio data session sed between the requesting terminal 10*aa* and the relay apparatus 30*e* and the image/audio data session sed between the destination terminal 10*aa* and the relay apparatus 30*e* are established, the relay apparatus 30*a* may be able to relay low-resolution image data, medium-resolution image data, high-resolution image data, and audio data to/from the terminals 10*aa* and 10*db*. In this way, the terminals 10*aa* and 10*db* may start a video conference.

Note that when the destination terminals 10*bb* and 10*cb* accept a response indicating authorization to start communication with the requesting terminal 10*aa*, a process similar to the above-described process for establishing a communication session between the requesting terminal 10*aa* and the destination terminal 10*db* may be performed with respect to the destination terminals 10*bb* and 10*cb*. In this way, a video conference may be started at multiple locations.

In the following, referring to FIG. 28, an example process of transmitting/receiving image data and audio data to/from the requesting terminal 10*aa* and the destination terminal 10*db* to hold a video conference between the terminals is described. Note that in the present embodiment, data transmission/reception and delay time detection involved in the process of transmitting image data and audio data in one direction from the terminal 10*aa* to the terminal 10*db* may be substantially identical to data transmission/reception and delay time detection in the process of transmitting image data and audio data in the opposite direction from the terminal 10*db* to the terminal 10*aa*. As such, in the following, communication in one direction will be described, and a description of communication in the opposite direction will be omitted.

In step S81, the requesting terminal 10*aa* uses the image/audio data session sed to transmit image data of an object captured by the imaging unit 14 and audio data input to the audio input unit 15 from the transmission/reception unit 11 to the relay apparatus 30*e* via the communication network 2. Note that in this step, high-quality image data, which includes low-resolution image data, medium-resolution image data, and high-resolution image data, and audio data are transmitted to the relay apparatus 30*e*. Thus, the transmission/reception unit 31 of the relay apparatus 30*e* receives the image data in the above three resolutions and the audio data from the requesting terminal 10*aa*.

Then, in step S82, the data quality check unit 33 checks the image quality of image data to be relayed by searching the quality change management table (see FIG. 5) using the IP address "1.3.2.4" of the relay destination terminal 10*db* as a search key and extracting information on the corresponding image quality of image data to be relayed to the relay destination terminal 10*db*. Note that in the present example (based on the quality change management table of FIG. 5), "high image quality" is determined to be the corresponding image quality of the image data to be relayed which is the same as the image quality of the image data received by the transmission/reception unit 31 in step S81. As such, in step S83, the relay apparatus 30*e* uses the image/audio data session sed image to transmit the image data and the audio data as is to the destination terminal 10*db*. In turn, the transmission/reception unit 11 of the destination terminal 10*db* receives the image data and the audio data, and the display control unit 16 displays an image on the display 120 based on the received image data while the audio output unit 15*b* outputs audio based on the received audio data.

Then, in step S84, the delay detection unit 18 of the terminal 10*db* periodically detects the reception delay time of the image data received by the transmission/reception unit 11 at fixed time intervals (e.g. every second). Note that in the following, an example case where the detected delay time is 200 (ms) is described.

In step S85, the transmission/reception unit 11 of the destination terminal 10*db* uses the management information session sei to transmit delay information indicating the detected delay time "200 (ms)" to the management system 50 via the communication network 2. In this way, the management system 50 may be notified of the delay time and the IP address "1.3.2.4" of the terminal 10*db* corresponding to the sender of the delay information.

Then, in step S86, the delay time management unit 60 of the management system 50 searches the terminal management table (see FIG. 9) using the IP address "1.3.2.4" of the destination terminal 10*db* as a search key to extract the corresponding terminal ID "01db" of the terminal 10*db*, and further searches the session management table (see FIG. 11) using the extracted terminal ID "01db" as a search key to store and manage the delay information indicating the delay time "200 (ms)" in the "delay time" field of the record including the terminal ID "01db" in the terminal management table.

Then, in step S87, the quality determination unit 58 searches the quality management table (see FIG. 12) using the delay time "200 (ms)" as a search key to extract the corresponding image quality "medium image quality" of image data to be relayed, and determines that image data of "medium image quality" should be relayed.

Then, in step S88, the transmission/reception unit 51 searches the relay apparatus management table (see FIG. 7) using the relay apparatus ID "111e", which is associated with the terminal ID "01db" in the session management table (see FIG. 11), as a search key to extract the IP address "1.1.1.3" of the corresponding relay apparatus 30*e*.

Then, in step S89, the transmission/reception unit 51 uses the management information session sei to transmit quality information indicating the image quality "medium image quality" determined in step S87 to the relay apparatus 30*e* via the communication network 2. The quality information includes the IP address "1.3.2.4" of the destination terminal 10*db* that was used as a search key in step S86. In turn, in step S90, the quality change management unit 34 of the relay apparatus 30*e* stores and manages the IP address "1.3.2.4" of the destination terminal 10*db* corresponding to the relay destination terminal and the image quality "medium image quality" of the image data to be relayed in association with each other in the quality change management table (see FIG. 5).

In step S91, the terminal 10*aa* continues to transmit image data and audio data to the relay apparatus 30*e* using the image/audio data session sed in a manner substantially identical to step S81. That is, the terminal 10*aa* continues to transmit high-quality image data including low-resolution image data, medium-resolution image data, and high-resolution image data as well as audio data to the relay apparatus 30*e*. In step S92, as in step S82, the data quality check unit 33 of the relay apparatus 30*e*, checks the image quality of image data to be relayed by searching the quality change management table (see FIG. 5) using the IP address "1.3.2.4" of the destination terminal 10*db* as a search key and extracting the corresponding image quality "medium image quality" of image data to be relayed.

In the present case, the corresponding image quality "medium image quality" extracted in step S92 is of a lower quality than the image quality "high image quality" of the image data received by the transmission/reception unit 31 in step S91. As such, in step S93, the data quality change unit 35 changes the image quality of the image data to be relayed by degrading the image quality from "high image quality" to "medium image quality". Then, in step S94, the transmission/reception unit 31 uses the image/audio data session sed to transmit the image data that has been changed t "medium image quality" and the audio data that has not been changed to the terminal 10*db* via the communication network 2. As described above, in a case where reception delay occurs at the destination terminal (terminal 10*db*) receiving image data, the relay apparatus 30*e* can change the image quality of image data to be relayed such that participants of a video conference will not experience a sense of awkwardness.

Note that a process similar to the above-described process for transmitting image data and audio data to the terminal 10*db* may be performed with respect to the terminal 10*bb* and the terminal 10 *cb*.

In the following, referring to FIG. 29, process steps corresponding to example processes of steps S1003 through S1009 of FIG. 18 are described in a case where the destination terminal 10*cb* joins an image/audio data session (also referred to as "call data session" hereinafter) that has already been established between a plurality of terminals (terminal 10*aa* and terminal 10*db*). Note that in the example of FIG. 29, the destination terminal 10*cb* corresponds to the terminal 10-1 of FIG. 18. Also, in the example of FIG. 29, the management information session sei is used to transmit/receive all types of management information that are exchanged between the terminals 10 and the management system 50.

In step S101, the user of the requesting terminal 10*aa* may operate the operation button (FIG. 2) such that the requesting terminal 10*aa* accepts information indicating a request to notify the destination terminal 10*cb* of the session ID of the call data session sed to enable the destination terminal 10*cb* to join the corresponding session. Then, in step S102, the transmission/reception unit 11 of the requesting terminal 10*aa* transmits session ID notification request information, including the terminal ID "01aa" of the requesting terminal 10*aa*, the terminal ID "01cb" of the destination terminal 10*cb*, and the session ID "set" of the call data session sed, to the management system 50. When the management system 50 receives the session ID notification request information, the transmission/reception unit 51 transmits session ID notification information, including the terminal ID "01aa" of the requesting terminal 10*aa* and the session ID "se1", to the destination terminal 10*cb* (step S103).

In step S104, the destination terminal 10*cb* receives and accepts the session ID notification information as a request to join the call data session sed. Note that process of step S104 corresponds to an example process of step S1003 of FIG. 18 in which a terminal 10 joins a conference by specifying a conference ID (session ID).

Then, the processes of steps S1004 through S1008 of FIG. 18 as described above are performed. Upon accepting an approval operation in step S1008, the transmission/reception unit 11 of the destination terminal 10*cb* transmits session participation request information, including the terminal ID "01cb" of the destination terminal 10*cb*, change request information "Call" indicating a request to participate in the call data session, and the session ID "set", to the management system 50 (step S105).

Upon receiving the session participation request information, the status management unit 53 of the management system 50 uses the terminal ID "01cb" of the terminal 10*cb* included in the session participation request information to change information indicated in the "communication status" field of the record including the terminal ID "01cb" in the terminal management table (see FIG. 9) (step S106).

Then, the session management unit 57 adds the terminal ID "01cb" of the terminal 10*cd* requesting to participate in the call data session sed with the session ID "se1" to the "destination terminal" field of the record including the session ID "se1" in the session management table (see FIG. 11) of the nonvolatile storage unit 5000.

Then, in steps S107-1 and S107-2, the transmission/reception unit 51 of the management system 50 transmits a participation notification, including the terminal ID "01cb" of the terminal 10cb that is to participate (join) in the call data session sed and the session ID "se1", to the requesting terminal 10aa and the destination terminal 10db that have already started the call data session sed. In this way, the requesting terminal 10aa and the destination terminal 10db may be notified that the destination terminal 10cb is joining the call data session sed. Also, in step S107-3, the transmission/reception unit 51 of the management system 50 transmits a participation authorization notification, including the session ID "se1" to be used to participate in the call data session sed and the relay apparatus connection information used to establish connection with the relay apparatus 30e, to the destination terminal 10cb that is to start the call data session sed.

When the terminal 10cb receives the participation authorization notification, the transmission/reception unit 11 transmits the session ID "se1" and the relay apparatus connection information included in the received participation authorization notification to the relay apparatus 30e to establish connection with the relay apparatus 30e (step S108). Further, the transmission/reception unit 11 of the terminal 10cb transmits relay request information to the management system 50 at a predetermined timing after establishing connection with the relay apparatus 30e. The relay request information transmitted to the management system 50 includes the terminal ID "01cb" of the terminal 10cb, the session ID "se1", and change request information "Join" indicating a request to start relaying call data. Then, the management system 50 and the relay apparatus 30e may perform processes similar to steps S72-1, S73-1, S74-1, and S75-1 of FIG. 27 to establish the call data session sed between the terminal 10cb and the relay apparatus 30e. When the call data session sed is established, the relay apparatus 30e may be able to relay image data in three resolutions (high-resolution, medium-resolution, and low-resolution) and audio data to/from the terminals 10aa, 10cb, and 10db. In this way, a video conference may be started between the terminals 10aa, 10cb, and 10db.

In the following, referring to FIG. 30, a process is described where the requesting terminal 10aa leaves the call data session after the call data session has been established between the requesting terminal 10aa and the destination terminals 10cb and 10db. Note that in the example of FIG. 27, the management information session sei is used to transmit/receive all types of management information.

In step S111, the user of the requesting terminal 10aa may operate the operation button 108 of FIG. 2 such that the requesting terminal 10aa accepts a request to leave (exit) the call data session sed. Then, in step S112, the transmission/reception unit 11 of the requesting terminal 10aa transmits session exit request information, including the terminal ID "01aa" of the requesting terminal 10aa, change request information "Leave" indicating a request to leave the call data session, and the session ID "set", to the management system 50.

Upon receiving the session exit request information, the status management unit 53 of the management system 50 uses the terminal ID "01aa" of the requesting terminal 10aa included in the received session exit request information to change the information indicated in the "communication status" field of the record including the terminal ID "01aa" in the terminal management table (see FIG. 9) (step S113).

Then, in step S114, the session management unit 57 deletes the terminal ID "01aa" of the requesting terminal 10aa from the "requesting terminal" field of the record including the session ID "se1" in the session management table (see FIG. 11) of the nonvolatile memory section 5000. Then, in step S115, the management system 50 transmits a session exit request, including the terminal ID "01aa" of the requesting terminal 10aa and the session ID "se1", to the relay apparatus 30e (step S115). In this way, the relay apparatus 30e can stop the call data session with the requesting terminal 10aa and disconnect the connection established with the requesting terminal 10aa. Then, in step S116, the relay apparatus 30e transmits a session exit authorization notification, including the request terminal ID "01aa" of the requesting terminal 10aa and the session ID "se1", to the management system 50.

When the management system 50 receives the session exit authorization notification, the transmission/reception unit 51 transmits session exit authorization information including, the terminal ID "01aa" of the requesting terminal 10aa, the change request information "Leave", the session ID "se1", and notification information "OK" indicating authorization of the exit request, to the requesting terminal 10aa (step S117). Upon receiving the session exit authorization information, the power switch 109 (FIG. 2) of the terminal 10aa may be operated and the terminal 10aa may accept the operation as a power-off request (step S118). When the power-off request is accepted, the transmission/reception unit 11 transmits disconnection request information, including to the management system 50 a disconnect request information, including the terminal ID "01aa" of the terminal 10aa and notification information indicating that connection with the management system 50 is to be cut off, to the management system 50 (step S119).

When transmission/reception unit 51 of the management system 50 receives the disconnection request information, the status management unit 53 uses the terminal ID "01aa" of the requesting terminal 10aa included in the disconnection request information to delete the information indicated in the "communication status" field of the record including the terminal ID "01aa" in the terminal management table (see FIG. 9) (step S120). Then, in step S121, the transmission/reception unit 51 transmits disconnection authorization information indicating authorization of the disconnection request to the requesting terminal 10aa. Then, the management system 50 stops the management information session with the requesting terminal 10aa and disconnects the connection established with the requesting terminal 10aa.

Upon receiving the disconnection authorization information, the requesting terminal 10aa turns off its power and ends the communication process (step S122). Note that processes similar to the above-described processes of step S111 to S121 for enabling the terminal 10aa to leave the call data session sed may be performed with respect to the terminal 10cb and the terminal 10db as well.

According to an aspect of the present invention, a management system includes a terminal management unit for managing information on a codec supported by each terminal, a determination unit for determining, in response to receiving a communication start request from a requesting terminal, whether content data communication between the requesting terminal and a counterpart terminal is possible based on information on a codec supported by the requesting terminal and information on a codec supported by the counterpart terminal, and a transmission unit for transmitting a result of the determination to the requesting terminal. In this way, information on codecs that can be used in a conference can be conveyed to a terminal even when the terminal is not actually participating in the conference, for example.

Further, note that in a conventional technique for holding a multipoint conference using an MCU (Multi-point Control Unit), for example, in a data communication session between a terminal 10 and the MCU, only one encoder and one decoder can be used. Thus, if the terminal 10 does not support any encoder or decoder that is supported by the MCU, codec conversion (transcoding) has to be implemented. Thus, an expensive high-performance MCU is required. On the other hand, according to an embodiment of the present invention, each terminal 10 is configured to decode and output image and audio transmitted from another terminal 10 participating in the multipoint conference, as such, even in one conference, an encoder and a decoder to be used may be selected with respect to each terminal 10. Further, the user of a terminal 10 may be notified of another terminal 10 that would not be able to transmit/receive image or audio to/from the terminal 10.

Also, according to an aspect of the embodiment described above, the terminal 10 is configured to determine whether to participate in a conference based on codec correspondence information received from the management system 50. Thus, the terminal 10 may choose to participate in a conference even when video or audio cannot be transmitted from the terminal 10 to another terminal 10 (e.g., if the user of the terminal 10 merely wishes to observe/listen to the proceedings of the conference).

Note that in the above-described embodiment, the destination list as shown in FIG. 24 indicating destination names 1100-2 and icons 1100-3*a*, 1100-3*b*, and 1103-*c* within the destination list frame 1100-1 is to be displayed. However, the present invention is no limited thereto, and in other examples the destination list frame 1100-1 may be omitted and only the destination names 1100-2 and the icons 1100-3*a* 1100-3*b*, and 1103-*c* may be displayed.

Also, note that the management system 50 and the program providing system 90 according to embodiments of the present invention may each be configured by a single computer or a plurality of computers, for example. Further, in the case where the program providing system 90 is configured by a single computer, a program transmitted from the program providing system 90 may be divided into a plurality of modules or the program may be transmitted without undergoing such division. In the case where the program providing system 90 is configured by a plurality of computers, a program to be provided by the program providing system 90 may be divided into a plurality of modules and each of the computers may be configured to transmit a corresponding module of the program, for example.

Further, the terminal program, the relay apparatus program, and the transmission management program according to embodiments of the present invention may be stored in a recording medium or the HD 204, for example. These programs and the program providing system 90 including the HD 204 storing these programs may be implemented as a program product to be distributed domestically or abroad to be provided to a user and the like.

Further, in the above-described embodiment, the quality change management table as illustrated in FIG. 5, and the quality management table as illustrated in FIG. 12 are used to manage the image resolution of image data as an example of image quality of image data to be relayed by the relay apparatus 30. However, the present invention is not limited thereto, and in other embodiments, the image depth of image data may be managed as the image quality of image data, the sampling frequency of audio and/or the bit length of audio may be used to manage the quality of audio data, for example.

Further, although the reception date/time is managed in FIGS. 7, 9, and 11, the present invention is not limited thereto and in other embodiments, only the reception time may be managed, for example.

Further, in the above-described embodiment, the IP address of the relay apparatus is managed in FIG. 7 and the IP address of the terminal is managed in FIG. 9. However, the present invention is not limited thereto and other types of identification information for identifying the relay apparatus 30 and the terminal 10 on the communication network 2, such as the FQDN (Fully Qualified Domain Name) of the relay apparatus 30 and the terminal 10, may be managed, for example. In this case, an IP address corresponding to the FQDN may be acquired by a well-known DNS (Domain Name System) server, for example.

Note that the system configuration of the above-described embodiment is merely one example and various other system configurations may be used according to the application and purpose, for example.

Also, in the above-described embodiment, a video conference system is described as an example of the transmission system 1. However, the present invention is not limited thereto. In other embodiments, the transmission system 1 may be a telephone system using an IP (Internet Protocol) phone, for example. Also, the transmission system 1 may be a car navigation system, for example. In this case, for example, one terminal 10 may correspond to a car navigation apparatus mounted on an automobile and another terminal 10 may be a management terminal or a management server of a management center that manages the car navigation system, or another car navigation apparatus mounted on another automobile, for example. Further, the transmission system 1 may be an audio conference system or a PC (Personal Computer) screen sharing system, for example.

Further, the transmission system 1 may be a mobile telephone communication system. In this case, the terminal 10 may correspond to a mobile phone, for example. FIG. 31 is a diagram illustrating an example display of a destination list in this case. That is, the terminal 10, as a mobile phone, includes a body 151, a menu screen display button 152 arranged on the body 151, a display unit 153 arranged in the body 151, a microphone 154 arranged at a lower portion of the body 151, and a speaker 155 arranged on the body 151. The menu screen display button 152 is a button for displaying a menu screen in which icons representing various applications are displayed. The display unit 153 includes a touch panel such that a user may be able to select a destination name a communication counterpart to establish a call with another mobile phone corresponding to the communication counterpart.

Also, in the above-described embodiment, image data and audio data are described as examples of content data. However, the present invention is not limited thereto and in other embodiments, content data may include tactile (touch) data, for example. In this case, a tactile sensation felt by a user at one terminal may be transmitted to another terminal. Further, the content data may include olfactory (smell) data, for example. In this case, odor (smell) at one terminal may be transmitted to another terminal. Further, content data may include at least one of image data, audio data, tactile data, and olfactory data.

Also, although the transmission system 1 is used to hold a video conference between offices in the above-described embodiment, the present invention is not limited thereto. In other embodiments, the transmission system 1 may be used to enable meetings, general conversation among family members and/or friends, or unilateral presentation of information from one terminal to another terminal, for example.

Although the present invention has been described above with reference to certain illustrative embodiments, the present invention is not limited to these embodiments, and numerous variations and modifications may be made without departing from the scope of the present invention.

What is claimed is:

1. A management system comprising:
a memory storing a program; and
a processor configured to execute the program to implement processes of
   receiving a communication start request from a first terminal for starting communication with a second terminal corresponding to a communication counterpart of the first terminal;
   determining whether communication can be established between the first terminal and the second terminal based on information on a codec supported by the first terminal and information on a codec supported by the second terminal;
   transmitting a determination result of the determination to the first terminal;
   determining, with respect to each type of content data to be exchanged in the communication, whether transmission of the content data is possible and whether reception of the content data is possible, based on the codec information for both the first terminal and the second terminal; and
   displaying a screen on a display screen associated with the first terminal, the determination results regarding the transmission of the content data and receipt of the content data, with respect each type of content data to be exchanged in the communication, the screen further including an operation component for receiving a user operation to approve the determination result.

2. The management system according to claim 1, wherein the processor further implements processes of
   determining, based on the information on the codec supported by the first terminal, the information on the codec supported by the second terminal, and information on a codec supported by a third terminal corresponding to another communication counterpart of the first terminal, whether the communication can be established between the first terminal and the second terminal and between the first terminal and the third terminal.

3. The management system according to claim 1, wherein the processor further implements processes of
   receiving the approval of the determination result from the first terminal; and
   transmitting the communication start request to the second terminal upon receiving the approval from the first terminal.

4. The management system according to claim 1, wherein in a case where the processor determines, with respect to each type of content data to be exchanged in the communication, that transmission of the content data to the second terminal and reception of the content data from the second terminal are possible, the processor transmits the communication start request to the second terminal without transmitting the determination result of the determination to the first terminal.

5. A transmission terminal comprising:
a memory storing a program; and
a processor configured to execute the program to implement processes of
transmitting, to a management system that is connected to the transmission terminal, information on a codec for content data that is supported by the transmission terminal and a communication start request for starting communication of the content data with another transmission terminal;
receiving, from the management system, information on whether transmission of the content data is possible and whether reception of the content data is possible, and displaying the received information;
transmitting an approval notification to the management system upon accepting an approval operation approving the displayed information;
determining, with respect to each type of content data to be exchanged in the communication, whether transmission of the content data is possible and whether reception of the content data is possible, based on the codec information for both the first terminal and the second terminal; and
displaying a screen on a display screen associated with the first terminal, the determination results regarding the transmission of the content data and receipt of the content data, with respect each type of content data to be exchanged in the communication, the screen further including an operation component for receiving a user operation to approve the determination result.

6. A method of starting communication that is implemented by a management system, the method comprising:
   receiving a communication start request from a first terminal for starting communication with a second terminal corresponding to a communication counterpart of the first terminal;
   determining whether communication can be established between the first terminal and the second terminal based on information on a codec supported by the first terminal and information on a codec supported by the second terminal;
   transmitting a determination result of the determination to the first terminal;
   determining, with respect to each type of content data to be exchanged in the communication, whether transmission of the content data is possible and whether reception of the content data is possible, based on the codec information for both the first terminal and the second terminal; and
   displaying a screen on a display screen associated with the first terminal, the determination results regarding the transmission of the content data and receipt of the content data, with respect each type of content data to be exchanged in the communication, the screen further including an operation component for receiving a user operation to approve the determination result.

* * * * *